US00RE50903E

(19) United States
(12) Reissued Patent
Zhou et al.

(10) Patent Number: US RE50,903 E
(45) Date of Reissued Patent: May 26, 2026

(54) CHARGING APPARATUS AND TERMINAL

(71) Applicant: Honor Device Co., Ltd., Shenzhen (CN)

(72) Inventors: Haibin Zhou, Beijing (CN); Yupeng Qiu, Beijing (CN); Zhi Chang, Beijing (CN); Tieli Zhang, Beijing (CN)

(73) Assignee: HONOR DEVICE CO., LTD., Shenzhen (CN)

(21) Appl. No.: 18/375,837

(22) Filed: Oct. 2, 2023

Related U.S. Patent Documents

Reissue of:
(64) Patent No.: 11,183,863
Issued: Nov. 23, 2021
Appl. No.: 16/757,105
PCT Filed: Apr. 13, 2018
PCT No.: PCT/CN2018/083109
§ 371 (c)(1),
(2) Date: Apr. 17, 2020
PCT Pub. No.: WO2019/076012
PCT Pub. Date: Apr. 25, 2019

(30) Foreign Application Priority Data

Oct. 20, 2017 (CN) ..... 201710990022.0

(51) Int. Cl.
*H01M 10/46* (2006.01)
*H02J 7/00* (2006.01)

(52) U.S. Cl.
CPC ..... *H02J 7/007* (2013.01); *H02J 7/00304* (2020.01); *H02J 7/00308* (2020.01);
(Continued)

(58) Field of Classification Search
CPC .... H02J 7/007; H02J 7/00304; H02J 7/00308; H02J 7/0042; H02J 7/0047; H02J 2207/20
See application file for complete search history.

(56) References Cited

U.S. PATENT DOCUMENTS 6,891,355 B2 * 5/2005 Kernahan ..... H05B 41/2828 320/132
9,041,358 B2 5/2015 Kato et al.
(Continued)

FOREIGN PATENT DOCUMENTS

CN 101232196 A 7/2008
CN 101572431 A 11/2009
(Continued)

*Primary Examiner* — Joshua D Campbell
(74) *Attorney, Agent, or Firm* — Conley Rose, P.C.

(57) ABSTRACT

A charging apparatus includes a sampling module, a control module, a clamping module, and a switched capacitor module. The sampling module is configured to connect to a battery, collect current status information of the battery, and provide collected status information for the control module; the control module is configured to adjust output energy of the clamping module based on the status information, and provide a drive signal for the switched capacitor module, the clamping module is configured to connect to a power supply, receive power supply energy provided by the power supply, process the power supply energy into output energy, and provide the output energy for the switched capacitor module, and the switched capacitor module is configured to provide charging energy for the battery based on the drive signal provided by the control module and the output energy provided by the clamping module.

20 Claims, 12 Drawing Sheets

(52) U.S. Cl.
CPC ..... *H02J 7/0042* (2013.01); *H02J 7/0047* (2013.01); *H02J 2207/20* (2020.01)

(56) References Cited

U.S. PATENT DOCUMENTS

| | | | | |
|---|---|---|---|---|
| 10,374,450 | B2 | 8/2019 | Kim et al. | |
| 2008/0157723 | A1 | 7/2008 | Xing et al. | |
| 2009/0033293 | A1 | 2/2009 | Xing et al. | |
| 2009/0072803 | A1 | 3/2009 | Tiew et al. | |
| 2015/0207401 | A1 | 7/2015 | Zhang et al. | |
| 2015/0222135 | A1 | 8/2015 | Lee | |
| 2016/0154415 | A1* | 6/2016 | Bîzîitu ..... | G05F 1/575 323/280 |
| 2017/0179757 | A1 | 6/2017 | Kung et al. | |
| 2019/0245371 | A1 | 8/2019 | Qiu | |

FOREIGN PATENT DOCUMENTS

| | | | |
|---|---|---|---|
| CN | 103095127 | A | 5/2013 |
| CN | 104300630 | A | 1/2015 |
| CN | 104821612 | A | 8/2015 |
| CN | 106385076 | A | 2/2017 |
| CN | 106410897 | A | 2/2017 |
| CN | 106899051 | A | 6/2017 |
| JP | 2009106039 | A | 5/2009 |
| JP | 2010521943 | A | 6/2010 |
| JP | 2012055133 | A | 3/2012 |
| JP | 2012075272 | A | 4/2012 |
| JP | 2013211974 | A | 10/2013 |
| JP | 2014003889 | A | 1/2014 |
| JP | 2014027861 | A | 2/2014 |
| JP | 2014160903 | A | 9/2014 |

* cited by examiner

CHARGING APPARATUS AND TERMINAL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a *Reissue Application of U.S. Pat. No. 11,183,863 issued on Nov. 23, 2021, which is a* U.S. National Stage of International Patent Application No. PCT/CN2018/083109 filed on Apr. 13, 2018, which claims priority to Chinese Patent Application No. 201710990022.0 filed on Oct. 20, 2017. [Both of the aforementioned] *The patent* applications are hereby incorporated by reference in their entireties.

TECHNICAL FIELD

This application relates to the field of electronic technologies, and in particular, to a charging apparatus and a terminal.

BACKGROUND

During charging of a battery in a terminal, an external power supply provides a supply voltage, and the supply voltage is provided for the battery after being converted into a charging voltage by using a charging chip in the terminal. In a current terminal market, most charging chips are based on a switch-mode power supply circuit. Low charging efficiency of the switch-mode power supply circuit cannot meet a requirement of high current charging, and therefore a charging chip based on a switched capacitor circuit emerges.

However, an output status of the switched capacitor circuit totally depends on an input status. When power supply energy input to the charging chip based on the switched capacitor circuit fluctuates, charging energy provided by the charging chip for a battery also fluctuates accordingly. Consequently, there is a problem that a battery current or a battery voltage of the battery exceeds a standard value. Therefore, the charging chip based on the switched capacitor circuit is not totally applicable to a scenario with a relatively high requirement on charging energy.

SUMMARY

This application provides a charging apparatus and a terminal, to alleviate a problem that charging energy provided by a charging chip based on a switched capacitor circuit for a battery fluctuates with power supply energy of the chip.

According to a first aspect, this application provides a charging apparatus, and the apparatus includes a sampling module, a control module, a clamping module, and a switched capacitor module; the sampling module connects to the control module, and is configured to: connect to a battery, collect current status information of the battery, and provide the collected status information for the control module; the control module connects to the clamping module and the switched capacitor module, and is configured to:

adjust output energy of the clamping module based on the status information, and provide a drive signal for the switched capacitor module; the clamping module connects to the switched capacitor module, and is configured to: connect to a power supply, receive power supply energy provided by the power supply, process the power supply energy into output energy under control of the control module, and provide the output energy for the switched capacitor module; and the switched capacitor module is configured to: connect to the battery, and provide charging energy for the battery based on the drive signal provided by the control module and the output energy provided by the clamping module.

In the charging apparatus provided in the first aspect, the sampling module, the control module, and the clamping module constitute a feedback loop for charging the battery, so that the charging apparatus can adjust, in a timely manner based on the current status information of the battery, the charging energy provided for the battery. Therefore, the charging energy provided by the charging apparatus for the battery is not only related to the power supply energy received by the charging apparatus, but also related to a current status of the battery, and this is beneficial to alleviate a problem that the charging energy provided by the charging apparatus for the battery fluctuates with the power supply energy received by the charging apparatus.

In a possible design, the clamping module includes a clamping transistor, a first electrode of the clamping transistor is configured to connect to the power supply, a second electrode of the clamping transistor connects to the switched capacitor module, and a gate of the clamping transistor connects to the control module; and the control module is specifically configured to: generate a drive voltage based on the status information, and provide the drive voltage for the gate of the clamping transistor, where the drive voltage is used to adjust conductive impedance between the first electrode and the second electrode of the clamping transistor, and the conductive impedance of the clamping transistor is used to adjust the power supply energy received by the clamping transistor to the output energy.

In the forgoing solution, a clamping function of the clamping module is implemented by using the clamping transistor. The conductive impedance between the first electrode and the second electrode of the clamping transistor may be adjusted by using a voltage at the gate of the clamping transistor, to be specific, adjusted by using the drive voltage provided by the control module. When the conductive impedance between the first electrode and the second electrode changes, an energy loss resulting from passing through the clamping transistor by the power supply energy also changes accordingly, thereby adjusting the output energy of the clamping transistor, and further adjusting the charging energy provided by the switched capacitor module.

In a possible design, the status information includes a current value of a battery current and a voltage value of a battery voltage; and the control module is specifically configured to: when the current value of the battery current is greater than a preset first current threshold, and/or the voltage value of the battery voltage is greater than a preset first voltage threshold, generate a first drive voltage, and provide the first drive voltage for the gate of the clamping transistor, where the first drive voltage is used to adjust a status of the clamping transistor to a high conductive impedance state; or when the current value of the battery current is not greater than a first current threshold, and the voltage value of the battery voltage is not greater than a first voltage threshold, generate a second drive voltage, and provide the second drive voltage for the gate of the clamping transistor, where the second drive voltage is used to adjust a status of the clamping transistor to a low conductive impedance state.

In the forgoing solution, when either of the current value of the battery current and the voltage value of the battery voltage is greater than the corresponding threshold, it indicates that the battery is in an abnormal state. In this case, the control module adjusts the status of the clamping transistor to the high conductive impedance state, so that the clamping transistor can consume more energy, thereby reducing the output energy provided for the switched capacitor module. Therefore, the charging energy provided by the switched capacitor module for the battery is further reduced, to restore the battery to a normal state. When neither of the current value of the battery current and the voltage value of the battery voltage is greater than the corresponding threshold, it indicates that the battery is in the normal state. In this case, the control module adjusts the status of the clamping transistor to the low conductive impedance state, to reduce the energy loss caused by the clamping transistor.

In a possible design, the sampling module is further configured to: connect to the power supply, collect a voltage value of a supply voltage in the power supply energy provided by the power supply, and provide the collected voltage value of the supply voltage for the control module; and the control module is further configured to: when the voltage value of the supply voltage is greater than a preset second voltage threshold, provide a first cut-in voltage for the gate of the clamping transistor, where the first cut-in voltage is used to control the clamping transistor to disconnect from the power supply.

When the power supply provides an excessively high supply voltage for the charging apparatus, there is a risk of damaging an internal structure of the charging apparatus. In the forgoing solution, the sampling module collects the supply voltage, and provides the supply voltage for the control module. When the supply voltage is greater than the preset second voltage threshold, the control module may control, in a timely manner, the clamping transistor to disconnect from the power supply, and stop input of an excessively high supply voltage, thereby implementing overvoltage protection for the internal structure of the charging apparatus.

In a possible design, the clamping module further includes a sampling load and a detection unit, the second electrode of the clamping transistor connects to an input end of the sampling load, an output end of the sampling load connects to the switched capacitor module, and the detection unit connects to the input end and the output end of the sampling load, and the control module; the detection unit is configured to: obtain a voltage difference between the input end and the output end of the sampling load, determine, based on the voltage difference, a current value of an output current in the output energy provided by the clamping transistor for the switched capacitor module, and provide the current value of the output current for the control module; and the control module is further configured to: when the current value of the output current is greater than a preset second current threshold, provide the first cut-in voltage for the gate of the clamping transistor.

When the power supply provides an excessively high power supply current for the charging apparatus, there is also a risk of damaging the internal structure of the charging apparatus. In the forgoing solution, the detection unit may obtain the current value of the output current of the clamping module by using the sampling load. Because the current value of the output current of the clamping module is almost the same as a current value of the power supply current, it may be determined, based on a value relationship between the current value of the output current and the second current threshold, whether the power supply current is excessively high. When the power supply current is excessively high, the control module controls the clamping transistor to be disabled to disconnect the clamping transistor from the power supply, and stops input of the excessively high power supply current, thereby implementing overcurrent protection for the internal structure of the charging apparatus.

In a possible design, the clamping module further includes a protection transistor and a detection unit, a first electrode of the protection transistor is configured to connect to the power supply, a second electrode of the protection transistor connects to the first electrode of the clamping transistor, a gate of the protection transistor connects to the control module, and the detection unit connects to the first electrode of the clamping transistor, the second electrode of the clamping transistor, and the control module; the detection unit is configured to: obtain a voltage difference between the first electrode and the second electrode of the clamping transistor, determine, based on the voltage difference, a current value of an output current in the output energy provided by the clamping transistor for the switched capacitor module, and provide the current value of the output current for the control module; and the control module is further configured to: when the current value of the output current is greater than a preset second current threshold, provide a second cut-in voltage for the gate of the protection transistor, where the second cut-in voltage is used to control the protection transistor to disconnect from the power supply.

In the forgoing solution, because the impedance of the clamping transistor includes the high conductive impedance state and the low conductive impedance state, the impedance of the clamping transistor is known. The detection unit may collect the current value of the output current of the clamping module by using the clamping transistor. The control module determines, based on a value relationship between the current value of the output current and the second current threshold, whether the power supply current is excessively high. When the power supply current is excessively high, the control module controls the protection transistor to disconnect from the power supply, and stop input of the excessively high power supply current, thereby implementing overcurrent protection for the internal structure of the charging apparatus.

In a possible design, the sampling module is further configured to: connect to the power supply, collect a voltage value of a supply voltage in the power supply energy provided by the power supply, and provide the collected voltage value of the supply voltage for the control module; and the control module is further configured to: when the voltage value of the supply voltage is greater than a preset second voltage threshold, provide the second cut-in voltage for the gate of the protection transistor.

In the forgoing solution, when the voltage value of the supply voltage is excessively high, the control module provides the second cut-in voltage for the gate of the protection transistor, controls the protection transistor to disconnect from the power supply, and stops input of the excessively high supply voltage, thereby implementing overvoltage protection for the internal structure of the charging apparatus.

In a possible design, the status information of the battery includes the battery voltage; and the sampling module includes a voltage sampling unit, the voltage sampling unit connects to the control module, and the voltage sampling unit is configured to: connect to a positive pole of the battery and a negative pole of the battery, obtain a voltage at the positive pole and a voltage at the negative pole of the battery, determine the battery voltage based on the voltage at the positive pole of the battery and the voltage at the negative pole of the battery, and provide the battery voltage for the control module.

In the forgoing solution, the voltage sampling unit in the sampling module may determine the voltage value of the current battery voltage by collecting the voltage at the positive pole and the voltage at the negative pole of the battery. The voltage sampling module provides the voltage value of the battery voltage for the control module, so that the control module can control, based on the voltage value of the battery voltage, the charging energy provided by the charging apparatus for the battery.

In a possible design, the status information of the battery includes the battery current; and the sampling module includes a current sampling unit, and the current sampling unit connects to the control module, and is configured to: connect to an input end and an output end of a current sensing resistor of the battery, obtain a voltage at the input end and a voltage at the output end of the current sensing resistor, determine the battery current based on the voltage at the input end and the voltage at the output end of the current sensing resistor, and provide the battery current for the control module.

In the forgoing solution, the input end of the current sensing resistor connects to the negative pole of the battery, and the output end is grounded. The voltage sampling unit in the sampling module may determine a voltage difference between the input end and the output end of the current sensing resistor by collecting the voltage at the input end and the voltage at the output end of the current sensing resistor, and then may determine the current value of the battery current with reference to a resistance value of the current sensing resistor. The voltage sampling unit provides the current value of the battery current for the control module, so that the control module can control, based on the current value of the battery current, the charging energy provided by the charging apparatus for the battery.

According to a second aspect, this application further provides a terminal, including a charging interface, a battery, and a first charging apparatus that connects to the battery, where the first charging apparatus is the charging apparatus provided in any one of the first aspect or the designs of the first aspect, and the charging interface connects to the first charging apparatus, and is configured to: connect to a power supply outside the terminal, and connect the power supply to the first charging apparatus.

In the terminal provided in the second aspect, the first charging apparatus may serve as a charging chip of the terminal, and play a role of voltage transformation when charging the battery in the terminal.

In a possible design, the terminal further includes a second charging apparatus and a control chip; the second charging apparatus includes a second input interface, a second output interface, and a second control interface, the second input interface connects to the charging interface, the second output interface connects to the battery, the second control interface connects to the control chip, and the second charging apparatus is configured to: receive, by using the second control interface, a control signal provided by the control chip, and provide charging energy for the battery based on the control signal; the first charging apparatus includes a first input interface, a first output interface, and a first control interface, the first input interface connects to the charging interface, the first output interface connects to the battery, the first control interface connects to the control chip, and the first charging apparatus is configured to: receive, by using the first control interface, a control signal provided by the control chip, and provide charging energy for the battery based on the control signal; the control chip includes a power supply interaction interface, a first control output interface, and a second control output interface, the power supply interaction interface connects to the charging interface, the first control output interface connects to the first control interface of the first charging apparatus, and the second control output interface connects to the second control interface of the second charging apparatus; and the control chip is configured to: obtain type information of the power supply by using the power supply interaction interface, generate a control signal based to on the type information of the power supply, provide the control signal for the first charging apparatus by using the first control output interface, and provide the control signal for the second charging apparatus by using the second control output interface, where the control signal is used to control the first charging apparatus or the second charging apparatus to provide charging energy for the battery.

To charge the terminal, there may be a plurality of types of power supplies. Different power supplies are more suitable for different types of charging apparatuses. In the forgoing solution, the terminal further includes the second charging apparatus in addition to the first charging apparatus. Therefore, the terminal is applicable to a case in which charging is performed by using a plurality of types of power supplies. In addition, the control chip selects, based on the type information of the power supply, a charging apparatus to provide charging energy for the battery. Therefore, the selected charging apparatus is more suitable for the power supply, thereby achieving a better charging effect.

In a possible design, the type information of the power supply includes a non-rated power supply; and the control chip is specifically configured to: obtain the type information of the power supply by using the power supply interaction interface; and when the type information of the power supply is the non-rated power supply, provide a first control signal for the first charging apparatus by using the first control output interface, and provide a second control signal for the second charging apparatus by using the second control output interface, where the first control signal is used to disable the first charging apparatus to provide charging energy for the battery, and the second control signal is used to enable the second charging apparatus to provide charging energy for the battery.

In a process of charging the battery, the power supply needs to adjust the power supply energy to adapt to different charging phases of the battery. The first charging apparatus provided in this application includes a switched capacitor module that has relatively high charging efficiency and imposes a relatively high requirement on precision of adjusting the power supply energy by the power supply. In the forgoing solution, the control chip selects, based on the type information of the power supply, a charging apparatus to provide charging energy for the battery. When the power supply is the non-rated power supply, it indicates that adjustment precision of the power supply does not meet the requirement of the first charging apparatus. Therefore, the second charging apparatus is used to provide charging energy for the battery, to reduce a risk of damaging the terminal due to low adjustment precision of the power supply.

In a possible design, the type information of the power supply alternatively includes a rated power supply; and the control chip is alternatively specifically configured to: when the type information of the power supply is the rated power supply, provide a third control signal for the first charging apparatus by using the first control output interface, and provide a fourth control signal for the second charging apparatus by using the second control output interface, where the third control signal is used to enable the first charging apparatus to provide charging energy for the battery, and the fourth control signal is used to disable the second charging apparatus to provide charging energy for the battery.

In the forgoing solution, when the power supply is the rated power supply, it indicates that adjustment precision of the power supply can meet the requirement of the first charging apparatus. In this case, the control chip controls the first charging apparatus to provide charging energy for the battery. The first charging apparatus in this application includes a switched capacitor module that has relatively high charging efficiency. Therefore, when the power supply is the rated power supply, the control chip can control the first charging apparatus to provide charging energy for the battery, to obtain relatively high charging efficiency.

In a possible design, the type information of the power supply alternatively includes a rated power supply; the first charging apparatus further includes a sampling output interface, the sampling output interface connects to the control chip, and the first charging apparatus is further configured to provide, for the control chip by using the sampling output interface, status information collected by a sampling module; and the control chip further includes a status information input interface, the status information input interface connects to the sampling output interface of the charging apparatus, and the control chip is alternatively configured to: when the type information of the power supply is the rated power supply, obtain the status information by using the status information input interface, generate a rated control signal based on the status information, provide the rated control signal for the first charging apparatus by using the first control output interface, and provide the rated control signal for the second charging apparatus by using the second control output interface.

In a process of charging the battery, different types of charging apparatuses are applicable to different charging phases of the battery. In the forgoing solution, when the power supply is the rated power supply, a charging apparatus is further selected based on the status information of the battery, to provide charging energy for the battery. A status of the battery changes in the charging process, and therefore a better charging effect can be achieved when the charging apparatus is selected based on the status information of the battery.

In a possible design, the status information includes a current value of a battery current; and the control chip is specifically configured to: obtain the current value of the battery current by using the status information input interface; and when the current value of the battery current is less than a preset threshold, provide a first rated control signal for the first charging apparatus by using the first control output interface, and provide a second rated control signal for the second charging apparatus by using the second control output interface, where the first rated control signal is used to disable the first charging apparatus to provide charging energy for the battery, and the second rated control signal is used to enable the charging apparatus to provide charging energy for the battery; or when the current value of the battery current is not less than a preset threshold, provide a third rated control signal for the first charging apparatus by using the first control output interface, and provide a fourth rated control signal for the second charging apparatus by using the second control output interface, where the third rated control signal is used to enable the first charging apparatus to provide charging energy for the battery, and the fourth control signal is used to disable the charging apparatus to provide charging energy for the battery.

Because the first charging apparatus includes a switched capacitor module, the first charging apparatus is more suitable for a case in which charging is performed with a high current. Compared with the first charging apparatus, the second charging apparatus is more suitable for a case in which charging is performed with a low current. In a process of charging the battery, the battery current varies with a phase. In the forgoing solution, when there is a relatively high battery current, the control chip may control the first charging apparatus to provide charging energy for the battery, to obtain relatively high charging efficiency. When there is a relatively low battery current, the control chip may control the second charging apparatus to provide charging energy for the battery, to obtain higher security.

In a possible design, the second charging apparatus includes one or more of the following circuits: a switching power supply charging circuit, a linear charging circuit, a three-level charging circuit, and a switching power supply boost charging circuit.

In the forgoing solution, the switching power supply circuit, the linear charging circuit, the three-level charging circuit, and the switching power supply boost charging circuit are all charging circuits with relatively mature technologies, and can be better used with the first charging apparatus provided in this application.

DESCRIPTION OF EMBODIMENTS

Figure 1:
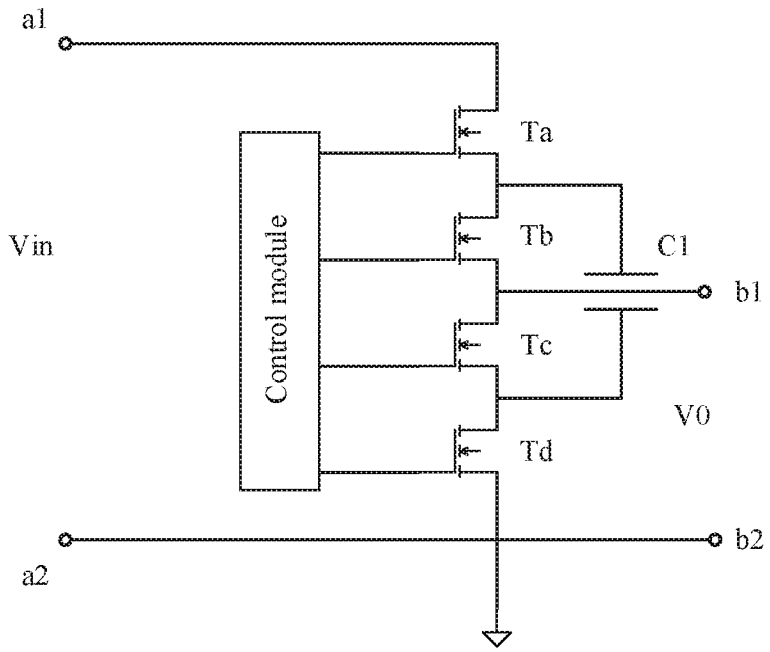
FIG. 1 is a schematic structural diagram of a switched capacitor charging circuit according to this application.

FIG. 1 is a schematic structural diagram of a switched capacitor charging circuit according to this application. The switched capacitor circuit shown in FIG. 1 mainly includes a control module, switching transistors Ta, Tb, Tc, and Td, a capacitor C1, an input terminal a1, an input terminal a2, an output terminal b1, and an output terminal b2. As shown in FIG. 1, the input terminal a1 and the input terminal a2 are configured to: connect to a power supply, and receive power supply energy provided by the power supply. Because energy in a circuit is transmitted in forms of a voltage and a current, a supply voltage Vin herein is used to represent the power supply energy. The output terminal b1 and the output terminal b2 are configured to: connect to a battery, and provide charging energy for the battery. A charging voltage V0 herein is used to represent the charging energy. A first electrode of the switching transistor Ta connects to the input terminal a1, a gate of the switching transistor Ta connects to the control module, and the switching transistor Ta is configured to be enabled or disabled under control of the control module. A first electrode of the switching transistor Tb connects to a second electrode of Ta, a gate of the switching transistor Tb connects to the control module, and the switching transistor Tb is configured to be enabled or disabled under control of the control module. A first electrode of the switching transistor Tc connects to a second electrode of Tb, a gate of the switching transistor Tc connects to the control module, and the switching transistor Tc is configured to be enabled or disabled under control of the control module. A first electrode of the switching transistor Td connects to a second electrode of Tc, a second electrode of the switching transistor Terminal device connects to the input terminal a2 and the output terminal b2, a gate of the switching transistor Td connects to the control module, and the switching transistor Td is configured to be enabled or disabled under control of the control module. A first plate of C1 connects to the second electrode of the switching transistor Ta, a second plate of C1 connects to the second electrode of the transistor Tc, and C1 is configured to: when the switching transistor Ta and the switching transistor Tc are enabled, and the switching transistor Tb and the switching transistor Td are disabled, store power supply energy input by the power supply; and when the switching transistor Ta and the switching transistor Tc are disabled, and the switching transistor Tb and the switching transistor Td are enabled, output charging energy to the battery by using the output terminal b1 and the output terminal b2.

For the switched capacitor charging circuit shown in FIG. 1, the charging energy fluctuates with the power supply energy. Specifically, at a first time point, the control module enables Ta and Tc. and disables Tb and Td, and C1 stores the power supply energy provided by the power supply. At a second time point, the control module disables Ta and Tc, and enables Tb and Td. An output status of the switched capacitor charging circuit fluctuates with an input status of the switched capacitor charging circuit. Especially, when a power supply current fluctuates, a charging current output by the switched capacitor charging circuit fluctuates more severely.

However, for the battery, either an excessively high charging voltage or an excessively high charging current causes a battery voltage or a battery current of the battery to exceed a rated standard value of the battery, causing damage to the battery. Therefore, the existing switched capacitor charging circuit is not totally applicable to a usage scenario with a relatively high requirement on precision of a charging voltage or a charging current.

As shown in FIG. 1, the input terminal a1 and the input terminal a2 are configured to input power supply energy. The input terminal a2 is grounded, and is with an electric potential of 0. Therefore, the description can be simplified as that the input terminal a1 is configured to input the power supply energy. Similarly, the output terminal b1 and the output terminal b2 are configured to output a charging voltage V0. The output terminal b2 is grounded. Therefore, the description can also be simplified as that the output terminal b1 is configured to output the charging energy. For simplified description, unless otherwise specified, a conduction relationship between a voltage, energy, a current, and the like is expressed in this form in this application.

It should be noted that the term "a plurality of" in the description of this application means two or more. In view of this, "a plurality of" may be understood as "at least two" in the embodiments of the present invention. The term "and/or" describes an association relationship for describing associated objects and represents that three relationships may exist. For example, A and/or B may represent the following three cases: Only A exists, both A and B exist, and only B exists. In addition, the character "/" usually indicates an "or" relationship between the associated objects unless specified otherwise. In addition, it should be understood that in the description of this application, terms such as "first" and "second" are used only for distinguishing between description, and cannot be understood as an indication or an implication of relative importance or an indication or an implication of a sequence.

To alleviate a problem that charging energy provided by a switched capacitor charging circuit fluctuates with power supply energy, the embodiments of the present invention provide a charging apparatus. It should be understood that the charging apparatus provided in the embodiments of this application may be an independent electronic device that can charge a battery outside the apparatus. Certainly, when integrated into a terminal, the charging apparatus may alternatively charge a battery in the terminal as a charging chip of the terminal.

Figure 2:
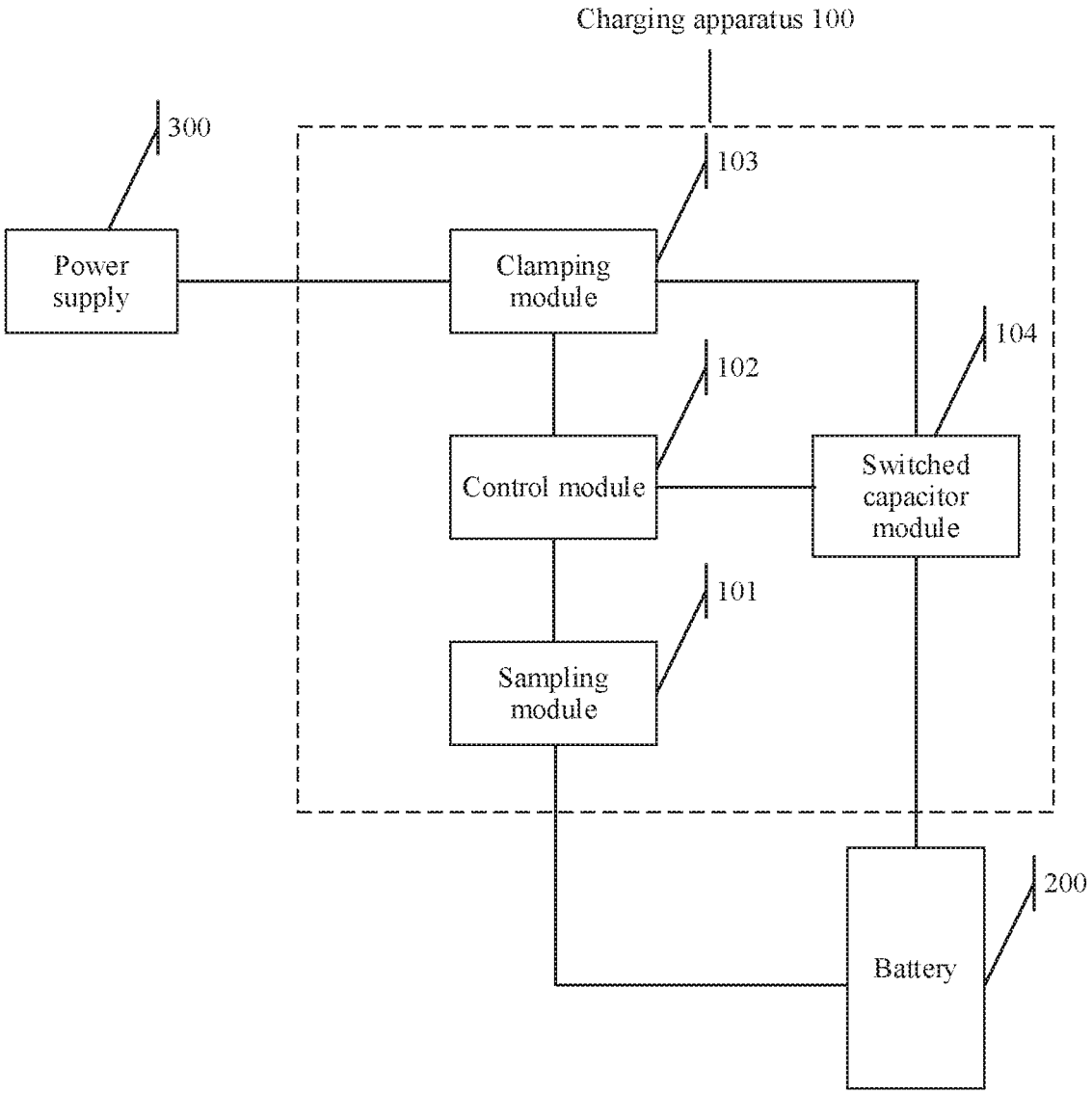
FIG. 2 is a schematic structural diagram 1 of a charging apparatus according to an embodiment of this application.

FIG. 2 is a schematic structural diagram of a charging apparatus according to an embodiment of this application. As shown in FIG. 2, a charging apparatus 100 includes a sampling module 101, a control module 102, a clamping module 103, and a switched capacitor module 104. The sampling module 101 connects to the control module 102 and a battery 200, and is configured to: collect current status information of the battery 200, and provide the collected status information for the control module 102. The control module 102 connects to the sampling module 101, the clamping module 103, and the switched capacitor module 104, and is configured to: adjust output energy of the clamping module 103 based on the status information of the battery 200 that is provided by the sampling module 101, and provide a drive signal for the switched capacitor module 204. The clamping module 103 connects to a power supply 300, the control module 102, and the switched capacitor module 104, and is configured to: receive power supply energy provided by the power supply 300, process the power supply energy into output energy under control of the control module 102, and provide the output energy for the switched capacitor module 104. The switched capacitor module 104 connects to the control module 102, the clamping module 103, and the battery 200, and is configured to provide charging energy for the battery 200 based on the drive signal provided by the control module 102 and the output energy provided by the clamping module 103.

In the charging apparatus 100 shown in FIG. 2, the control module 102 may obtain the status information of the battery 200 by using the sampling module 101, and determine, based on the status information, a control signal provided for the clamping module 103. The status information of the battery 200 may indicate whether the battery 200 is in an abnormal state during charging. The control module 102 may determine, based on the status information, whether the battery 200 is currently in the abnormal state, and then adjust the output energy provided by the clamping module 103 for the switched capacitor module 104. The output energy of the clamping module 103 is provided for the switched capacitor module 104 as an input of the switched capacitor module 104, and an output of the switched capacitor module 104 is provided for the battery 200 as charging energy. A structure of the switched capacitor module 104 is a switched capacitor circuit similar to the switched capacitor charging circuit shown in FIG. 1, and the switched capacitor module 104 also has a feature that an output fluctuates with an input. When the control module 102 adjusts the output energy of the clamping module 103, the charging energy provided by the switched capacitor module 104 for the battery 200 is also adjusted accordingly. Therefore, it can be learned that the charging apparatus 100 shown in FIG. 2 may adjust, based on a status of the battery 200, the charging energy provided for the battery 200. When the battery 200 is in the abnormal state, the charging energy may be adjusted in a timely manner to restore the battery 200 to a normal state. This is beneficial to alleviate a problem that charging energy output by a switched capacitor charging circuit fluctuates with input power supply energy.

It should be understood that each module in the charging apparatus 100 shown in FIG. 2 may have a plurality of actual implementation structures. For example, the switched capacitor module 104 may use a 2:1 switched capacitor charging circuit shown in FIG. 1, or may use a structure of a 3:1 switched capacitor charging circuit. Only one switched capacitor charging circuit structure may be used for charging, or a plurality of switched capacitor charging circuits may be connected in parallel to improve charging efficiency. These structures may be flexibly used in actual implementation, and are all included in the embodiments of this application.

It should be understood that the module in the charging apparatus 100 described in FIG. 2 may directly connect to the battery 200 or the power supply 300, or may connect to the battery 200 or the power supply 300 by using a terminal, an interface, a pin, or the like of the charging apparatus 100. All these are conventional solutions that are easily figured out by a person skilled in the art. This is not limited in this application.

Figure 3:
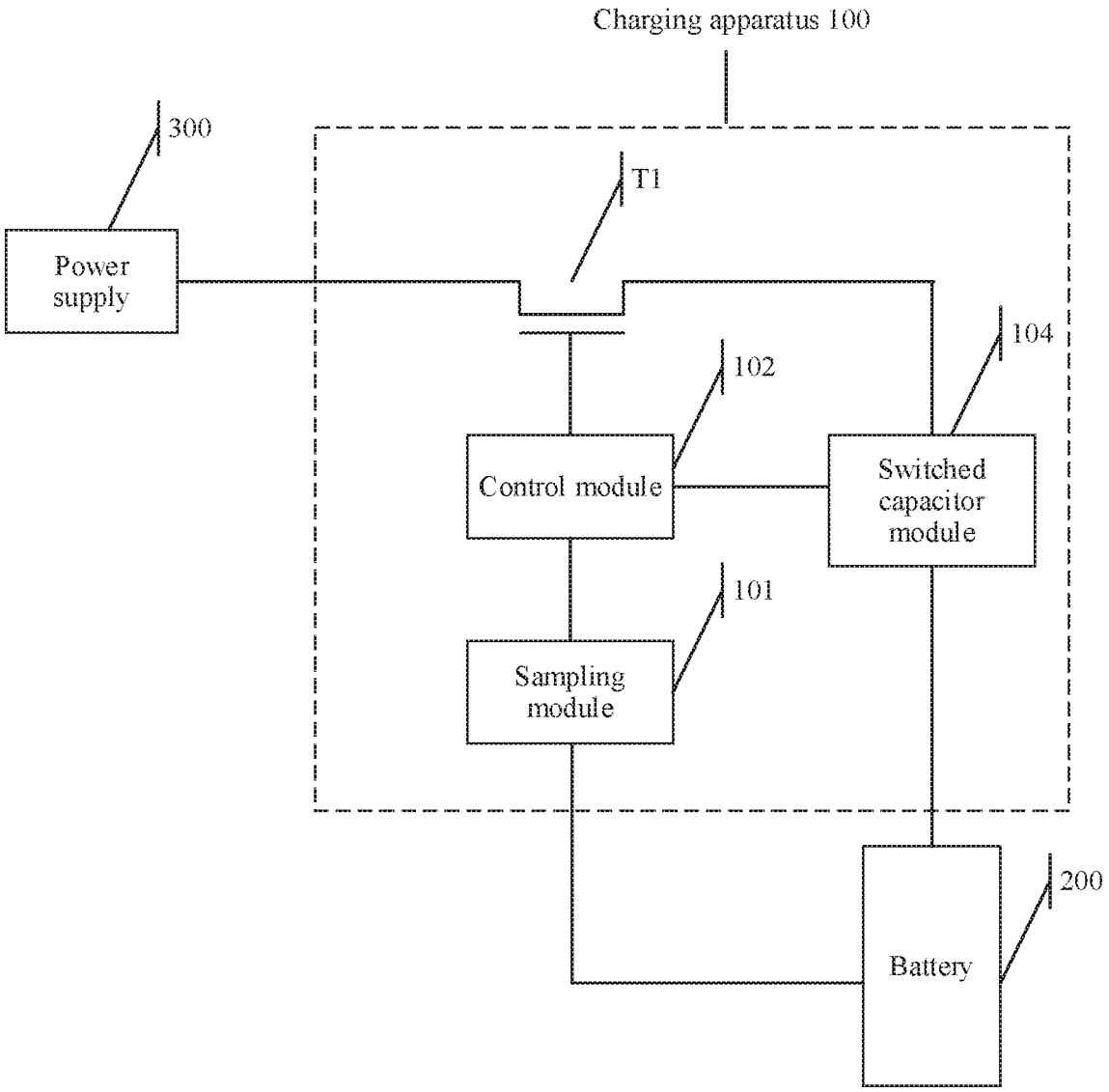
FIG. 3 is a schematic structural diagram 2 of a charging apparatus according to an embodiment of this application.

In the charging apparatus provided in this application, a clamping function of the clamping module 103 may be implemented by a transistor. As shown in FIG. 3, the clamping module 103 includes a clamping transistor T1. A first electrode of the clamping transistor T1 connects to the power supply 300, a second electrode of the clamping transistor T1 connects to the switched capacitor module 104, and a gate of the clamping transistor T1 connects to the control module 102. The control module 102 connects to the gate of the clamping transistor T1, and is specifically configured to: generate a drive voltage based on the status information of the battery 200, and provide the drive voltage for the gate of the clamping transistor T1. The drive voltage is used to adjust conductive impedance between the first electrode and the second electrode of the clamping transistor T1. The conductive impedance of the clamping transistor T1 is used to adjust the power supply energy received by the clamping transistor T1 to output energy.

When the charging apparatus 100 shown in FIG. 3 works normally, the clamping transistor T1 is conducted. The conductive impedance between the first electrode and the second electrode is under control of a voltage at the gate of the clamping transistor T1. The control module 102 may generate the drive voltage based on the status information of the battery 200, and provide the drive voltage for the gate of the clamping transistor T1, thereby implementing control of the conductive impedance of the clamping transistor T1. An energy loss occurs when the power supply energy passes through the clamping transistor T1, and a magnitude of the energy loss is determined based on the conductive impedance of the clamping transistor T1. Therefore, the control module 102 can adjust the conductive impedance of the clamping transistor T1 by using the drive voltage, to adjust the output energy of the clamping transistor T1.

Based on the charging apparatus 100 shown in FIG. 3, in a possible design, the status information may include a current value of a battery current and a voltage value of a battery voltage. The control module 102 is specifically configured to: when the current value of the battery current is greater than a preset first current threshold, and/or the voltage value of the battery voltage is greater than a preset first voltage threshold, generate a first drive voltage, and provide the first drive voltage for the gate of the clamping transistor T1. When the first drive voltage is applied to the gate of the clamping transistor T1, a status of the clamping transistor T1 can be adjusted to a high conductive impedance state. Alternatively, the control module 102 is specifically configured to: when the current value of the battery current is not greater than a first current threshold, and the voltage value of the battery voltage is not greater than a first voltage threshold, generate a second drive voltage, and provide the second drive voltage for the gate of the clamping transistor T1. When the second drive voltage is applied to the gate of the clamping transistor T1, a status of the clamping transistor T1 can be adjusted to a low conductive impedance state.

In specific implementation, the first voltage threshold may be a rated battery voltage value obtained when the battery is normally charged. The rated battery voltage value is a maximum charging voltage obtained when the battery is charged with a constant voltage. The first current threshold may be a rated battery current value obtained when the battery is normally charged. The rated battery current value is a maximum charging current obtained when the battery is charged with a constant current. Optionally, the first current threshold may be slightly greater than the rated battery current value, to reduce a quantity of times the status of the clamping transistor T1 is switched due to a slight fluctuation of the power supply energy. Similarly, the first voltage threshold may be slightly greater than the rated battery voltage value, to reduce the quantity of times the status of the clamping transistor T1 is switched due to the slight fluctuation of the power supply energy.

Based on the charging apparatus 100 shown in FIG. 3, the control module 102 may provide two different drive voltages for the gate of the clamping transistor T1 based on the status information of the battery 200. When either of the current value of the battery current and the voltage value of the battery voltage is greater than the corresponding threshold, it indicates that the battery 200 is in the abnormal state, the charging energy provided, in this case, by the apparatus 100 for the battery 200 exceeds an upper limit that the battery can withstand, and the charging apparatus 100 needs to reduce the charging energy. In this case, the control module 102 adjusts the status of the clamping transistor T1 to the high conductive impedance state by applying the first drive voltage to the gate of the clamping transistor T1, so that the clamping transistor T1 consumes more energy, thereby reducing the output energy provided for the switched capacitor module 104. Therefore, the charging energy provided by the switched capacitor module for the battery 200 is further reduced, to restore the battery 200 to the normal state. When neither of the current value of the battery current and the voltage value of the battery voltage is greater than the corresponding threshold, it indicates that the battery 200 is in the normal state, and the charging energy provided by the charging apparatus 100 for the battery 200 does not exceed an upper limit that the battery can withstand. In this case, the charging apparatus 100 adjusts the status of the clamping transistor T1 to the low conductive impedance state by applying the second drive voltage to the gate of the clamping transistor T1, to reduce an energy loss caused by the clamping transistor T1, and improve charging efficiency.

Figure 4:
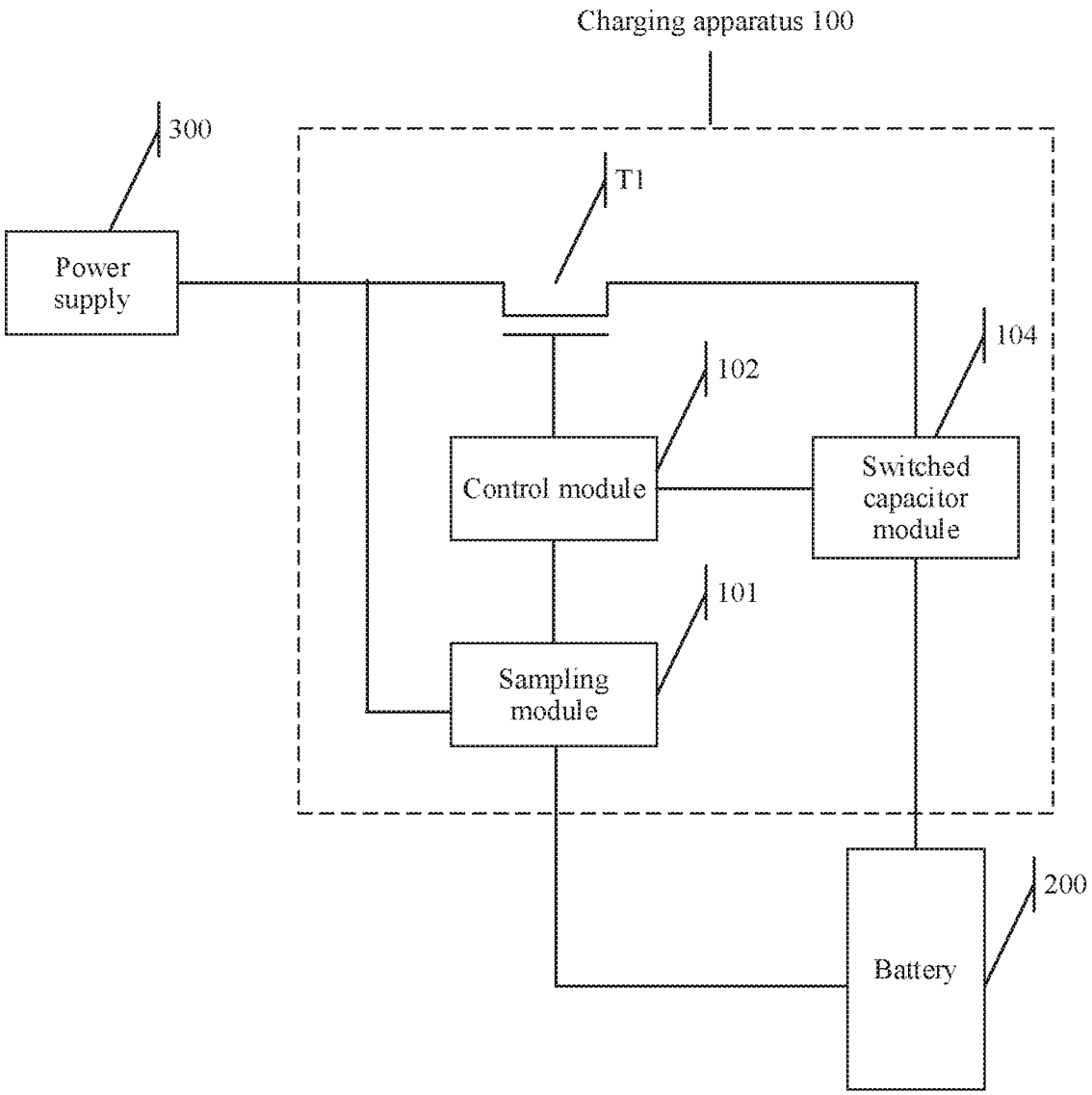
FIG. 4 is a schematic structural diagram 3 of a charging apparatus according to an embodiment of this application.

Based on the charging apparatus 100 shown in FIG. 3, this application further provides a charging apparatus with an overvoltage protection function. As shown in FIG. 4, the sampling module 101 further connects to the power supply 300, and is configured to: collect a voltage value of a supply voltage in the power supply energy, and provide the collected voltage value of the supply voltage for the control module 102. The control module 102 is further configured to: when the voltage value of the supply voltage is greater than a preset second voltage threshold, provide a first cut-in voltage for the gate of the clamping transistor T1. When the first cut-in voltage is applied to the gate of the clamping transistor T1, the first electrode and the second electrode of the clamping transistor T1 may be disconnected, and therefore a connection to the power supply 300 is ended.

When the charging apparatus 100 works, an excessively high supply voltage imposes a risk of damaging an internal structure of the charging apparatus 100. For example, a switching transistor in the switched capacitor module 104 is broken down due to the excessively high supply voltage, causing damage to the switched capacitor module 104. Therefore, it is necessary to add the overvoltage protection function to the charging apparatus 100. The control module 102 obtains the voltage value of the supply voltage by using the sampling module 101, and compares the voltage value with the preset second voltage threshold. The second voltage threshold may be determined based on an upper limit of a voltage that all components in the charging apparatus can withstand. When the supply voltage is greater than the preset second voltage threshold, it indicates that the supply voltage may cause damage to the internal structure of the charging apparatus 100. The control module 102 sends the first cut-in voltage to the clamping transistor T1, so that the clamping transistor T1 is disconnected from the power supply 300, and input of an excessively high supply voltage is stopped, thereby implementing overvoltage protection for the internal structure of the charging apparatus 100. In specific implementation, the first cut-in voltage may be determined based on a type of the clamping transistor T1. For example, when the clamping transistor T1 is a positive channel metal oxide semiconductor (Positive Channel Metal Oxide Semiconductor, PMOS) transistor, the first cut-in voltage is at a high level. When the clamping transistor T1 is a negative channel metal oxide semiconductor (Negative Channel Metal Oxide Semiconductor, NMOS) transistor, the first cut-in voltage is at a low level.

Figure 5:
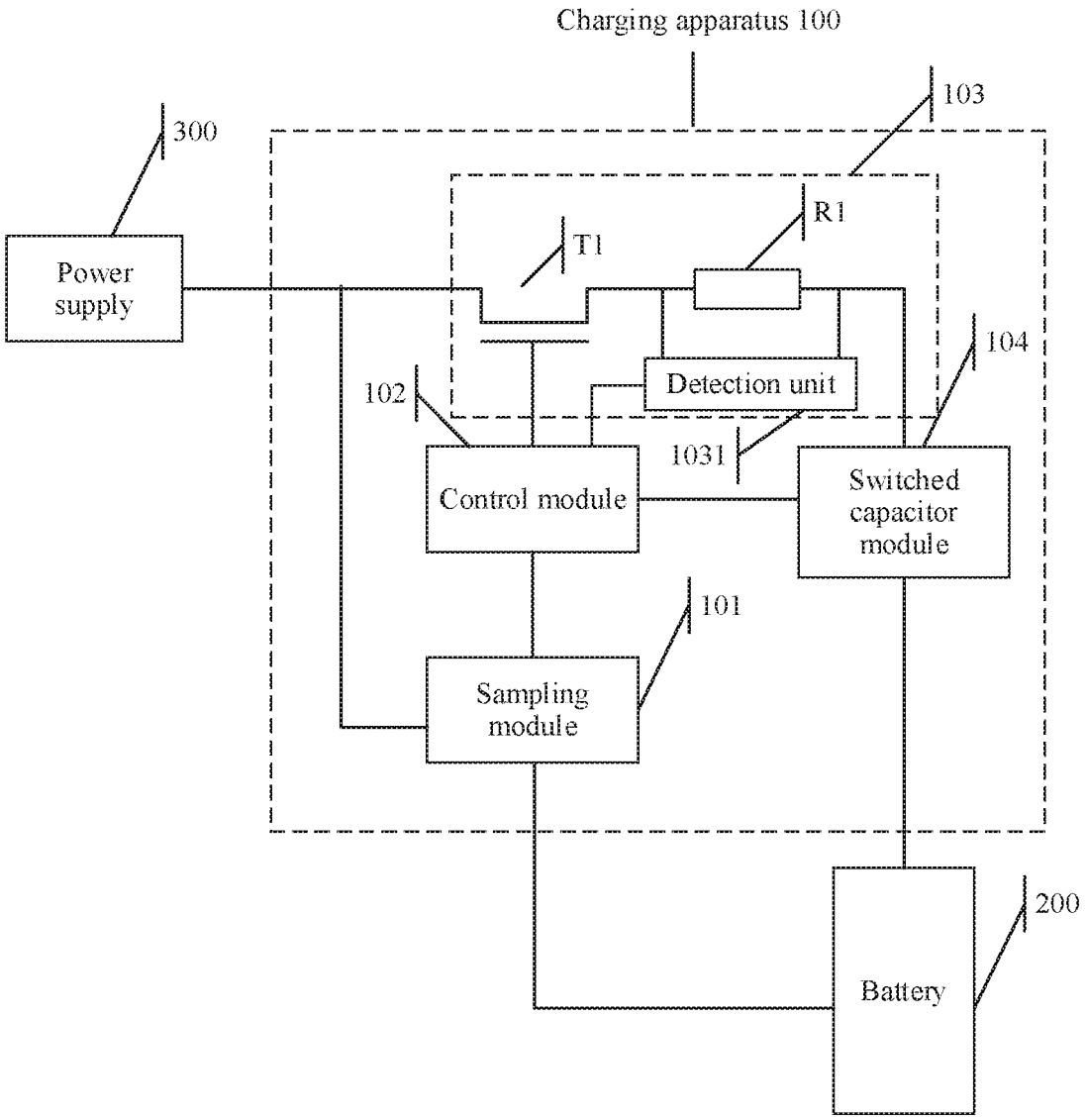
FIG. 5 is a schematic structural diagram 4 of a charging apparatus according to an embodiment of this application.

When the power supply provides an excessively high power supply current for the charging apparatus, there is also a risk of damaging the internal structure of the charging apparatus. Based on the charging apparatus 100 shown in FIG. 4, this application further provides a charging apparatus with both an overvoltage protection function and an overcurrent protection function. As shown in FIG. 5, the clamping module 103 in the charging apparatus 100 further includes a sampling load R1 and a detection unit 1031. The second electrode of the clamping transistor T1 connects to an input end of the sampling load R1, and an output end of the sampling load R1 connects to the switched capacitor module 104. The detection unit 1031 connects to the input end and the output end of the sampling load R1, and the control module 102. The detection unit 1031 is configured to: obtain a voltage difference between the input end and the output end of the sampling load R1, determine, based on the voltage difference, a current value of an output current in the output energy provided by the clamping transistor T1 for the switched capacitor module 104, and provide the current value of the output current for the control module 102. The control module 102 further connects to the detection unit 1031, and is further configured to: when the current value of the output current is greater than a preset second current threshold, provide the first cut-in voltage for the gate of the clamping transistor T1.

In FIG. 5, the sampling load R1 has a fixed resistance value, or the detection unit 1031 knows a resistance value of the sampling load R1. The detection unit 1031 detects and obtains the voltage difference between the input end and the output end of the sampling load R1, and then may determine the current value of the output current of the clamping module 103 based on the resistance value of the sampling load R1. When the clamping transistor T1 is conducted, a power supply current Iin received by the clamping transistor T1 by using a supply voltage input interface 105 flows through the sampling load R1. Therefore, the current value of the output current that is obtained by the detection unit 1031 by using the sampling load R1 actually is almost the same as a current value of the power supply current Iin. The control module 102 obtains the current value of the output current that is determined by the detection unit 1031, and compares the current value with the second current threshold. The second current threshold may be determined based on an upper limit of a current that all components in the charging apparatus 100 can withstand. When the current value of the output current is greater than the preset second current threshold, it indicates that the power supply current Iin may cause damage to the internal structure of the charging apparatus 100. The control module 102 sends the first cut-in voltage to the clamping transistor T1, so that the first electrode and the second electrode of the clamping transistor T1 are disconnected, a connection to the power supply 300 is ended, and input of an excessively high power supply current is stopped, thereby implementing overcurrent protection for the internal structure of the charging apparatus 100.

Figure 6:
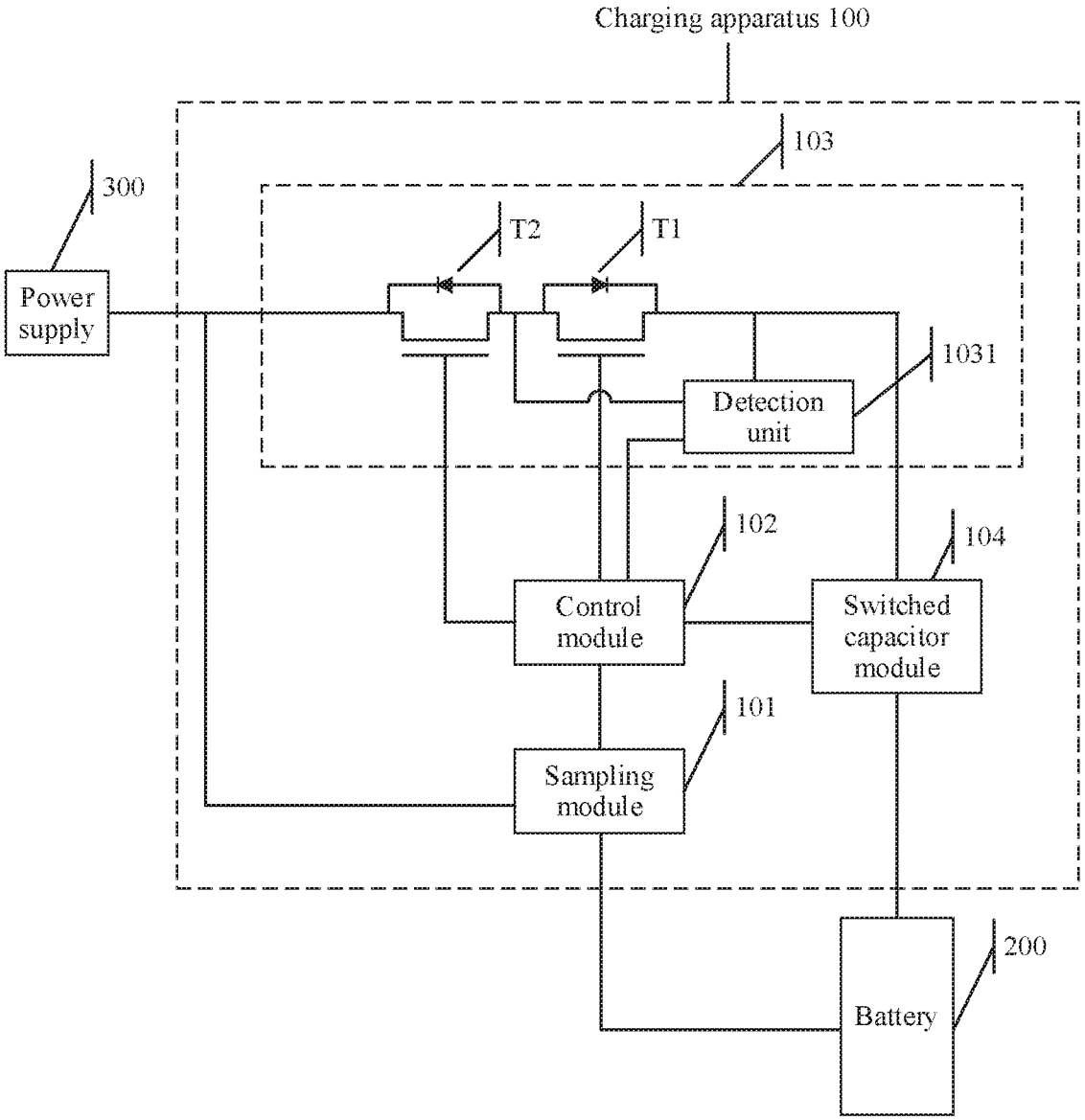
FIG. 6 is a schematic structural diagram 5 of a charging apparatus according to an embodiment of this application.

Based on the charging apparatus 100 shown in FIG. 3, FIG. 4, and FIG. 5, the overcurrent protection and the overvoltage protection are implemented for the internal structure by using the clamping module 103. This application further provides another structure of the clamping module 103, which also can implement the overcurrent protection and the overvoltage protection for the internal structure of the charging apparatus 100. In a feasible design solution, as shown in FIG. 6, the clamping module 103 further includes a protection transistor T2 and a detection unit 1031. A first electrode of the protection transistor T2 connects to the power supply 300, a second electrode of the protection transistor T2 connects to the first electrode of the clamping transistor T1, and a gate of the protection transistor T2 connects to the control module 102. The detection unit 1031 connects to the first electrode of the clamping transistor T1, the second electrode of the clamping transistor T1, and the control module 102. The detection unit 1031 is configured to: obtain a voltage difference between the first electrode and the second electrode of the clamping transistor T1, determine, based on the voltage difference, a current value of an output current in the output energy provided by the clamping transistor T1 for the switched capacitor module 104, and provide the current value of the output current for the control module 102. The control module 102 further connects to the gate of the protection transistor T2 and the detection unit 1031. The control module 102 is further configured to: when the current value of the output current is greater than a preset second current threshold, provide a second cut-in voltage for the gate of the protection transistor T2. When the second cut-in voltage is applied to the gate of T2, the first electrode and the second electrode of the protection transistor T2 can be disconnected, and therefore a connection to the power supply is ended.

When the charging apparatus 100 shown in FIG. 6 works normally, the clamping transistor T1 is conducted, and there is known high conductive impedance or known low conductive impedance between the first electrode and the second electrode of the clamping transistor T1. Therefore, the detection unit 1031 can determine the current value of the output current from the first electrode to the second electrode of the clamping transistor T1 based on the voltage difference between the first electrode and the second electrode of the clamping transistor T1 with reference to the impedance of the clamping transistor T1. When the current value of the output current is greater than the preset second current threshold, the control module 102 controls, by using the second cut-in voltage, the protection transistor T2 to be disabled. A specific process and principle are similar to those in the forgoing embodiment, and details are not described herein again. In addition, when providing the second cut-in voltage for the gate of the protection transistor T2, the control module 102 may further provide a first cut-in voltage for the gate of the clamping transistor T1, so that both the first electrode and the second electrode of the clamping transistor T1 are disconnected.

As shown in FIG. 6, the sampling module 101 further connects to the power supply 300. The sampling module 101 is further configured to: collect a voltage value of a supply voltage in the power supply energy, and provide the collected voltage value of the supply voltage for the control module 102. The control module 102 is further configured to: when the voltage value of the supply voltage is greater than a preset second voltage threshold, provide the second cut-in voltage for the gate of the protection transistor T2. In the charging apparatus 100 shown in FIG. 6, the overvoltage protection and the overcurrent protection are implemented for the internal structure of the charging apparatus 100 by enabling and disabling the protection transistor T2.

There is usually a parasitic diode in a transistor because of a manufacturing process. As shown in FIG. 6, a parasitic diode is connected in parallel to the first electrode and the second electrode of the clamping transistor T1, and a parasitic diode is connected in parallel to the first electrode and the second electrode of the protection transistor T2. In a feasible technical solution shown in FIG. 6, the parasitic diode in the clamping transistor T1 connects to a circuit in an input direction of the power supply current Iin, and the parasitic diode in the protection transistor T2 connects to the circuit in a direction opposite to the input direction of the power supply current Iin. The direction in which the parasitic diode in the clamping transistor T1 connects to the circuit is opposite to the direction in which the parasitic diode in the protection transistor T2 connects to the circuit, and therefore when charging is stopped, bidirectional current cut-off can be implemented in the circuit.

Figure 7:
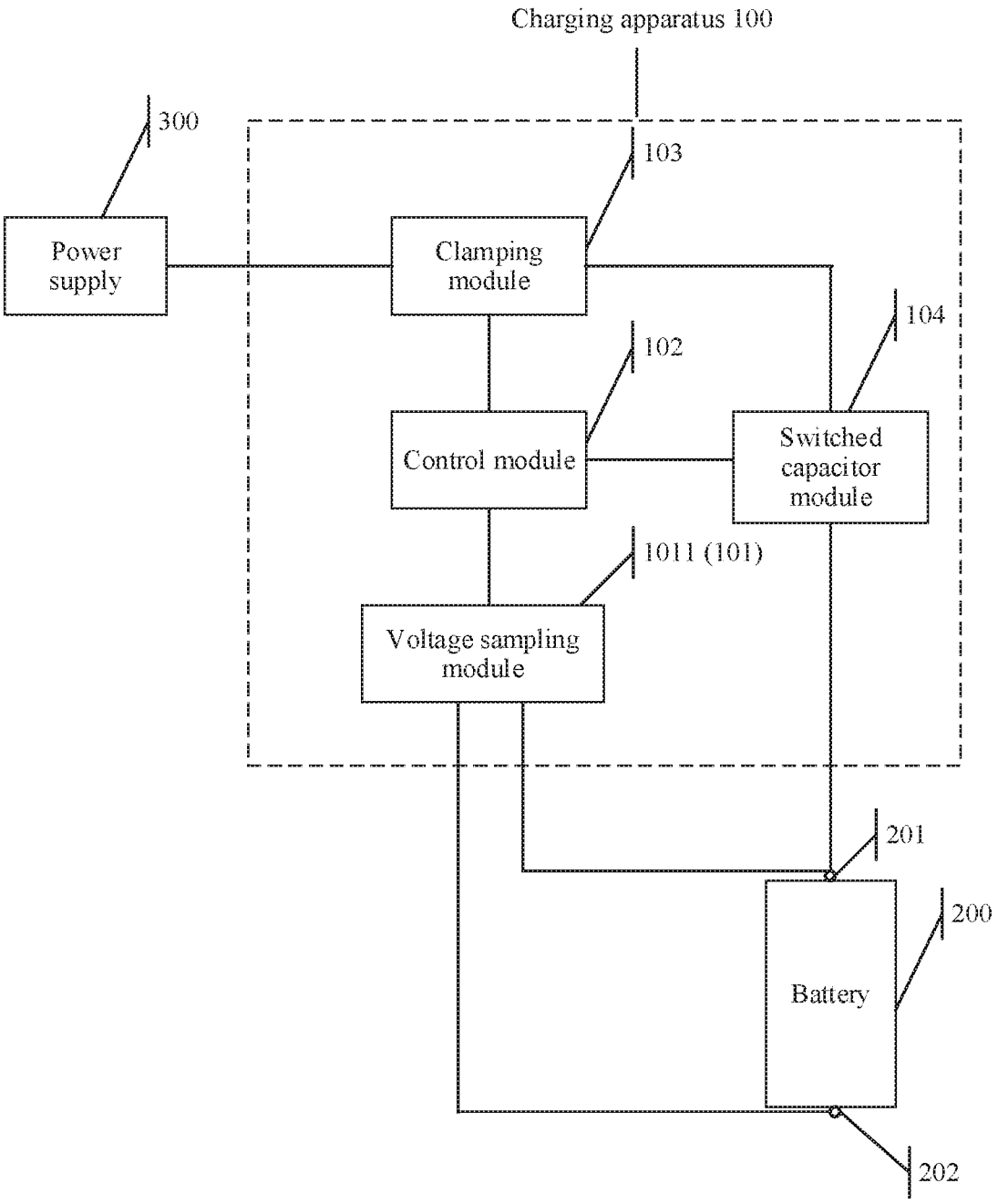
FIG. 7 is a schematic structural diagram 6 of a charging apparatus according to an embodiment of this application.

In a feasible technical solution, the status information of the battery includes the battery voltage. As shown in FIG. 7, the sampling module 101 includes a voltage sampling unit 1011. The voltage sampling unit 1011 connects to the control module 102, a positive pole of the battery 200, and a negative pole of the battery 200, and is configured to: obtain a voltage at the positive pole and a voltage at the negative pole of the battery 200, determine the battery voltage based on the voltage at the positive pole of the battery 200 and the voltage at the negative pole of the battery 200, and provide the battery voltage for the control module 102. In specific implementation of the voltage sampling unit 1011, the voltage sampling unit 1011 may be implemented by a comparator. Two input ends of the comparator are configured to respectively connect to the positive pole and the negative pole of the battery 200, and an output end of the comparator connects to the control module 102.

A battery charging process mainly includes two phases: a constant current charging phase and a constant voltage charging phase. At the constant current charging phase, the battery current Ib is constant, and is a rated current of the battery, or approximates to a rated current of the battery, and the battery voltage gradually increases to approximate to a rated voltage of the battery. Then the battery enters into the constant voltage charging phase, the battery voltage remains approximate to the rated voltage, and the battery current Ib gradually decreases until charging is completed. At the constant current charging phase and the constant voltage charging phase, a fluctuation of the power supply energy usually results in excessive charging energy provided for the battery, causing the battery voltage of the battery to exceed the rated voltage. In addition, a specific delay is required to perform a switchover from the constant current charging phase to the constant voltage charging phase, and therefore the battery voltage of the battery may exceed the rated voltage. The charging apparatus 100 provided in FIG. 7 in this application may obtain the battery voltage by using the voltage sampling unit 1011, and when the battery voltage exceeds the rated voltage, adjust, in a timely manner, the output energy provided by the clamping module 103 for the switched capacitor module 104, to adjust the charging energy provided by the switched capacitor module 104 for the battery 200. An entire control circuit includes the voltage sampling unit 1011, the control module 102, and the clamping module 103, and therefore a control process is implemented more quickly, and the battery voltage can be restored to a normal state in a timely manner.

Figure 8:
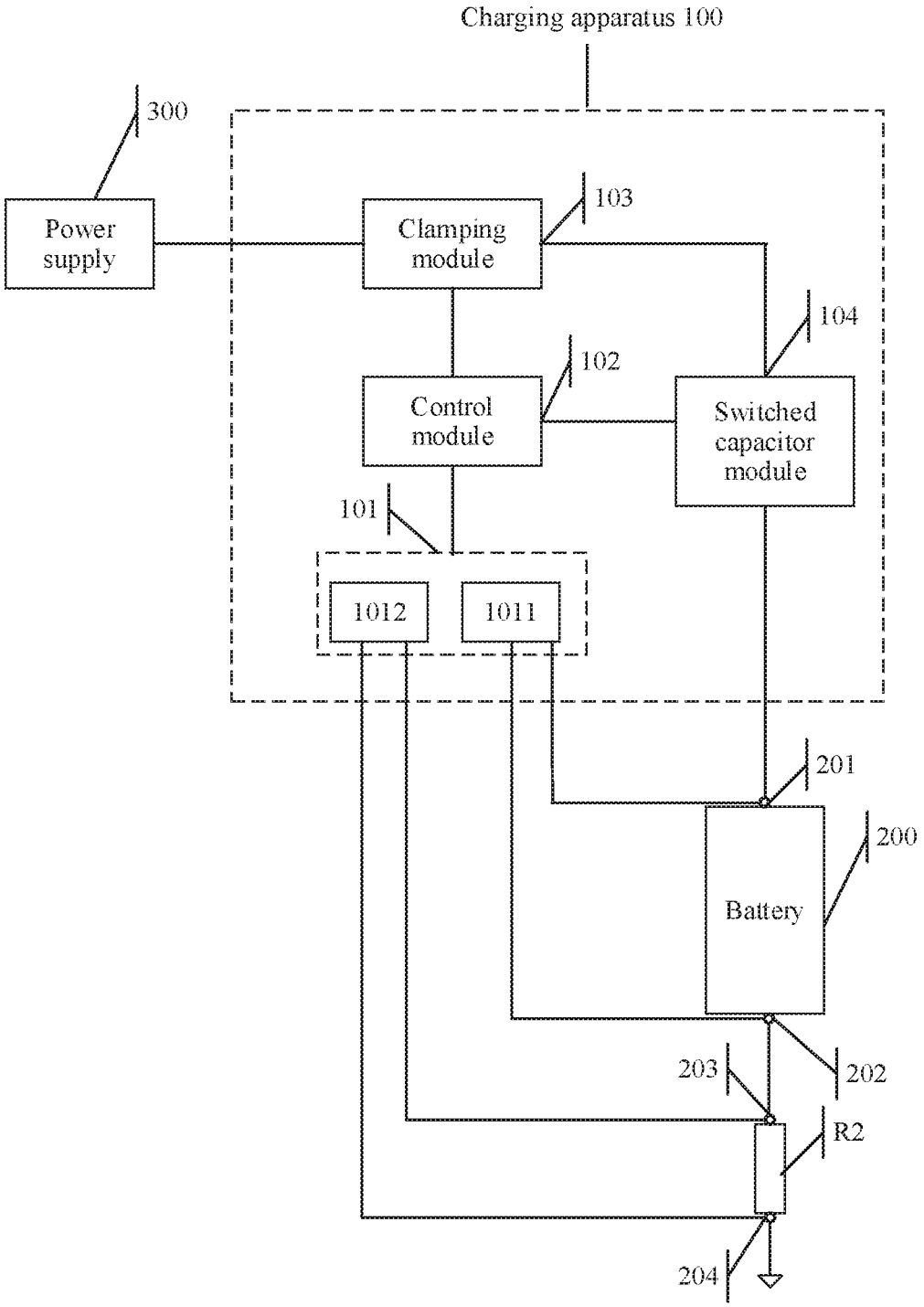
FIG. 8 is a schematic structural diagram 7 of a charging apparatus according to an embodiment of this application.

In a feasible technical solution, the status information of the battery includes the battery current Ib. As shown in FIG. 8, the sampling module 101 further includes a current sampling unit 1012. The current sampling unit 1012 connects to the control module 102, and an input end 203 and an output end 204 of a current sensing resistor R2, and is configured to: obtain a voltage at the input end 203 and a voltage at the output end 204 of the current sensing resistor R2, determine the battery current Ib based on the voltage at the input end 203 and the voltage at the output end 204, and provide the battery current Ib for the control module 102.

At the constant current charging phase and the constant voltage charging phase, a fluctuation of the power supply energy may also result in excessive charging energy provided for the battery, causing the battery current Ib of the battery to exceed the rated current. In addition, at the constant current charging phase, the battery current Ib is the rated current, or approximates to the rated current, and a switched capacitor circuit can magnify a fluctuation of the current, and therefore the battery current Ib is more likely to exceed the rated current of the battery at the constant current charging phase. In specific implementation of the current sampling unit 1012 shown in FIG. 8, the current sampling unit 1012 may be implemented by a comparator. Two input ends of the comparator are configured to respectively connect to the input end 203 of the current sensing resistor and the output end 204 of the current sensing resistor, and an output end of the comparator connects to the control module 102. In FIG. 8, the current sensing resistor R2 of the battery 200 has a fixed resistance value. The input end 203 of the current sensing resistor connects to the negative pole 202 of the battery 200, the output end 204 of the current sensing resistor is grounded, and the battery current Ib of the battery 200 flows through the current sensing resistor R2. The current sensing resistor R2 has a fixed resistance value, and therefore the current sampling unit 1012 can determine the battery current Ib by detecting the voltages at the input end 203 and the output end 204 of the current sensing resistor R2 and by using a voltage difference between the input end 203 and the output end 204. The control module 102 may further adjust, based on the battery current Ib, the output energy provided by the clamping module 103 for the switched capacitor module 104, to adjust the charging energy provided by the switched capacitor module 104 for the battery 200.

Figure 9:
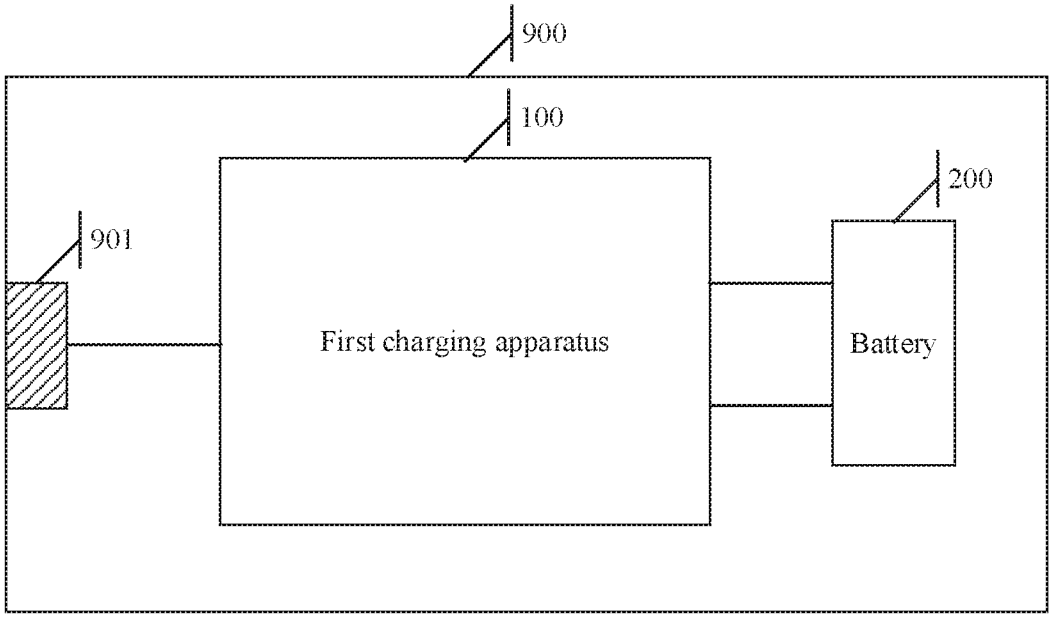
FIG. 9 is a schematic structural diagram 1 of a terminal according to an embodiment of this application.

Based on a same technical concept, an embodiment of the present invention further provides a terminal. As shown in FIG. 9, a terminal 900 includes a charging interface 901, a battery 200, and a first charging apparatus 100 that connects to the battery 200. The first charging apparatus 100 is the charging apparatus provided in any one of the forgoing embodiments. In the terminal, the charging interface 901 connects to the first charging apparatus 100, and is configured to: connect to a power supply outside the terminal 900, and connect the power supply to the first charging apparatus 100. The relatively common charging interface 901 includes but is not limited to a universal serial bus (Universal Serial Bus, USB) interface such as a micro USB interface (Micro USB, Micro_B) or a USB type-C (TYPE_C) interface, or another type of charging interface. The power supply may be a terminal charger such as a laptop charger or a mobile phone charger, or may be a mobile power supply such as a mobile power pack. The first charging apparatus 100 coverts a supply voltage in power supply energy provided by the power supply, and provides charging energy for the battery 200.

Figure 10:
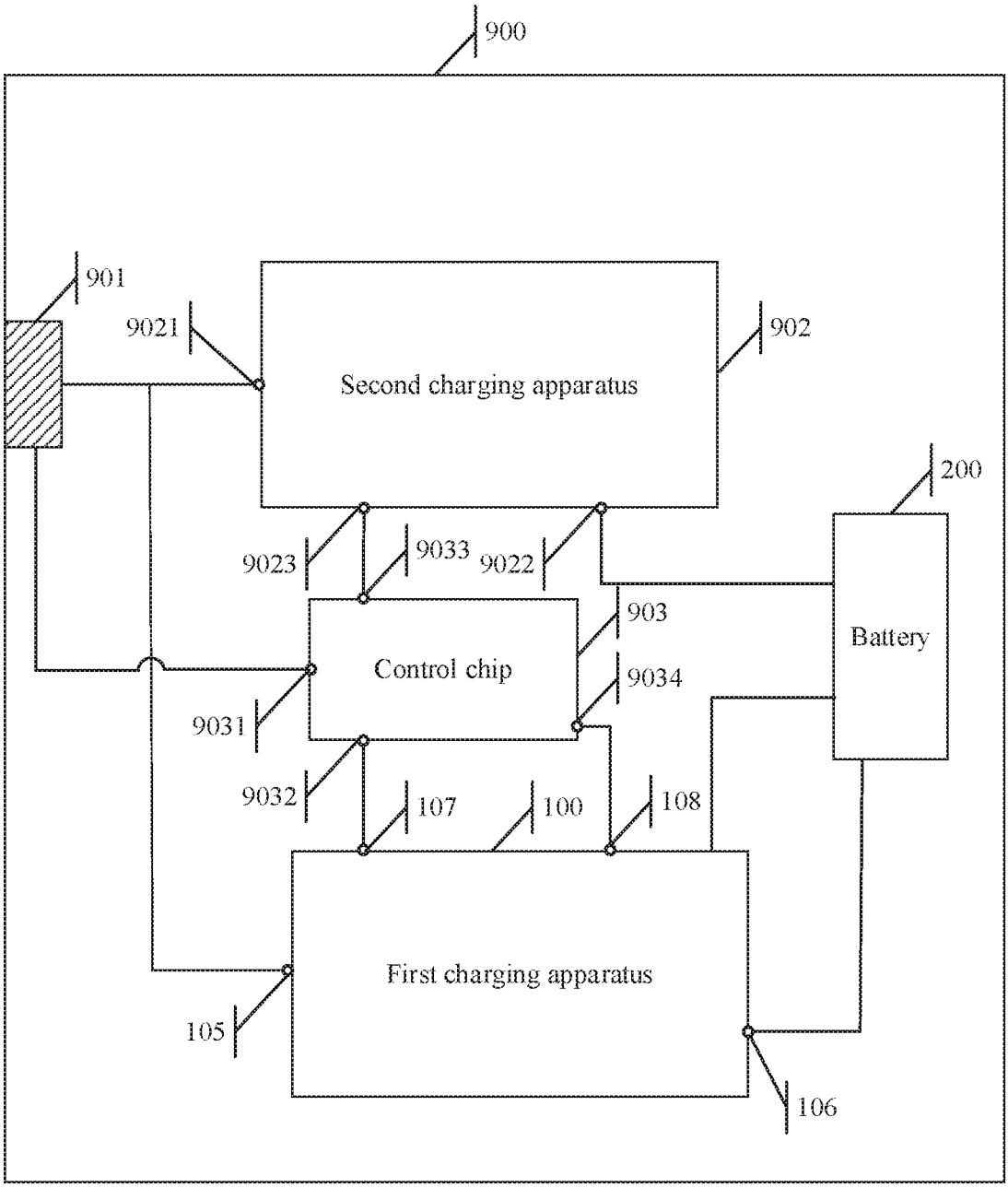
FIG. 10 is a schematic structural diagram 2 of a terminal according to an embodiment of this application.

In a feasible technical solution, as shown in FIG. 10, the terminal 900 further includes a second charging apparatus 902 and a control chip 903. The second charging apparatus 902 includes a second input interface 9021, a second output interface 9022, and a second control interface 9023. The second input interface 9021 connects to the charging interface 901, the second output interface 9022 connects to the battery 200, and the second control interface 9023 connects to the control chip 903. The second charging apparatus 902 is configured to: receive, by using the second control interface 9023, a control signal provided by the control chip 903, and provide charging energy for the battery 200 based on the control signal. The first charging apparatus 100 includes a first input interface 105, a first output interface 106, and a first control interface 107. The first input interface 105 connects to the charging interface 901, the first output interface 106 connects to the battery 200, and the first control interface 107 connects to the control chip 903. The first charging apparatus 100 is configured to: receive, by using the first control interface 107, a control signal provided by the control chip 903, and provide charging energy for the battery 200 based on the control signal. The control chip 903 includes a power supply interaction interface 9031, a first control output interface 9032, and a second control output interface 9033. The power supply interaction interface 9031 connects to the charging interface 901, the first control output interface 9032 connects to the first control interface 107 of the first charging apparatus 100, and the second control output interface 9033 connects to the second control interface 9023 of the second charging apparatus 902. The control chip 903 is configured to: obtain type information of the power supply by using the power supply interaction interface 901, generate a control signal based on the type information of the power supply, provide the control signal for the first charging apparatus 100 by using the first control output interface 9032, and provide the control signal for the second charging apparatus 902 by using the second control output interface 9033. The control signal is used to control the first charging apparatus 100 or the second charging apparatus 902 to provide charging energy for the battery 200.

To charge the terminal, there may be a plurality of types of power supplies. Different power supplies are more suitable for different types of charging apparatuses. For the terminal 900 shown in FIG. 10, the terminal 900 further includes the second charging apparatus 902 in addition to the first charging apparatus 100. Therefore, the terminal 900 is applicable to a case in which charging is performed by using a plurality of types of power supplies. In addition, the control chip 903 selects, based on the type information of the power supply, a charging apparatus to provide charging energy for the battery 200. Therefore, the selected charging apparatus is more suitable for the power supply, thereby achieving a better charging effect. The second charging apparatus 902 includes one or more of the following circuits: a switching power supply charging circuit, a linear charging circuit, a three-level charging circuit, and a switching power supply boost charging circuit. All these charging circuits are relatively mature charging circuits in the prior art. The second charging apparatus 902 in the terminal 900 is a charging circuit with a relatively mature technology, and can be better used with the first charging apparatus 100 provided in this application.

Based on the terminal structure shown in FIG. 10, there may be a plurality of solutions used by the control chip 903 to select the first charging apparatus 100 and the second charging apparatus 902. In a feasible technical solution, the type information of the power supply includes two types: a non-rated power supply and a rated power supply. The control chip 903 is specifically configured to: after the power supply connects to the charging interface 901, obtain the type information of the power supply by using the power supply interaction interface 9031. When the type information of the power supply is the non-rated power supply, the control chip 903 provides a first control signal for the first charging apparatus 100 by using the first control output interface 9032, and provides a second control signal for the second charging apparatus 902 by using the second control output interface 9033. The first control signal is used to disable the first charging apparatus 100 to provide charging energy for the battery 200, and the second control signal is used to enable the second charging apparatus 902 to provide charging energy for the battery 200.

In a process of charging the battery 200, the power supply needs to adjust power supply energy to adapt to different charging phases of the battery. The first charging apparatus 100 provided in this application includes a switched capacitor module 104 that has relatively high charging efficiency and imposes a relatively high requirement on precision of adjusting the power supply energy by the power supply. In the forgoing solution, the control chip 903 selects, based on the type information of the power supply, a charging apparatus to provide charging energy for the battery. When the power supply is the non-rated power supply, it indicates that adjustment precision of the power supply does not meet the requirement of the first charging apparatus 100. Therefore, the second charging apparatus 902 is used to provide charging energy for the battery, to reduce a risk of damaging the terminal due to low adjustment precision of the power supply.

When the type information of the power supply is the rated power supply, both of the following two control chips 903 provided in this application can select a charging apparatus.

A first control chip 903 is as follows:

The control chip 903 is specifically configured to: when the type information of the power supply is the rated power supply, provide a third control signal for the first charging apparatus 100 by using the first control output interface 9032, and provide a fourth control signal for the second charging apparatus 902 by using the second control output interface 9033. The third control signal is used to enable the first charging apparatus 100 to provide a charging voltage for the battery, and the fourth control signal is used to disable the second charging apparatus 902 to provide a charging voltage for the battery.

When the power supply is the rated power supply, it indicates that adjustment precision of the power supply can meet the requirement of the first charging apparatus 100. In this case, the control chip 903 controls the first charging apparatus 100 to provide charging energy for the battery 200. The first charging apparatus 100 in this application includes a switched capacitor module 104 that has relatively high charging efficiency. Therefore, when the power supply is the rated power supply, the control chip 903 can control the first charging apparatus 100 to provide charging energy for the battery 200, to obtain relatively high charging efficiency.

A second control chip 903 is as follows:

As shown in FIG. 10, the first charging apparatus 100 further includes a sampling output interface 108, and the sampling output interface 108 connects to the control chip 903. The first charging apparatus 100 is further configured to provide, for the control chip 903 by using the sampling output interface 108, status information collected by a sampling module.

The control chip 903 further connects to the sampling output interface 108 of the first charging apparatus 100, and is specifically configured to: when the type information of the power supply is the rated power supply, obtain the status information of the battery 200 by using a status information input interface 9034, generate a rated control signal based on the status information, provide the rated control signal for the first charging apparatus 100 by using the first control output interface 9032, and provide the rated control signal for the second charging apparatus 902 by using the second control output interface 9033.

In a process of charging the battery 200, different types of charging apparatuses are applicable to different charging phases of the battery. In the forgoing solution, when the type information of the power supply is the rated power supply, a charging apparatus is further selected based on the status information of the battery 200, to provide charging energy for the battery. A status of the battery 200 changes in the charging process, and therefore a better charging effect can be achieved when the charging apparatus is selected based on the status information of the battery.

For the second control chip 903, in a feasible technical solution, the control chip 903 may obtain a current value of a battery current by using the status information input interface 9034. When the current value of the battery current is less than a preset threshold, the control chip 903 provides a first rated control signal for the first charging apparatus 100 by using the first control output interface 9032, and provides a second rated control signal for the second charging apparatus 902 by using the second control output interface 9033. The first rated control signal is used to disable the first charging apparatus 100 to provide charging energy for the battery 200, and the second rated control signal is used to enable the second charging apparatus 902 to provide charging energy for the battery 200. When the current value of the battery current is not less than a preset threshold, the control chip 903 provides a third rated control signal for the first charging apparatus 100 by using the first control output interface 9032, and provides a fourth rated control signal for the second charging apparatus 902 by using the second control output interface 9033. The third rated control signal is used to enable the first charging apparatus 100 to provide charging energy for the battery 200, and the fourth control signal is configured to disable the second charging apparatus 902 to provide charging energy for the battery 200.

Because the first charging apparatus 100 includes a switched capacitor module 104, the first charging apparatus 100 is more suitable for a case in which charging is performed with a high current. Compared with the first charging apparatus 100, the second charging apparatus 902 is more suitable for a case in which charging is performed with a low current. In a process of charging the battery 200, the battery current varies with a phase. In the forgoing solution, when there is a relatively high battery current, the control chip 903 may control the first charging apparatus 100 to provide charging energy for the battery 200, to obtain relatively high charging efficiency. When there is a relatively low battery current, the control chip 903 may control the second charging apparatus 902 to provide charging energy for the battery 200, to obtain higher security.

Figure 11:
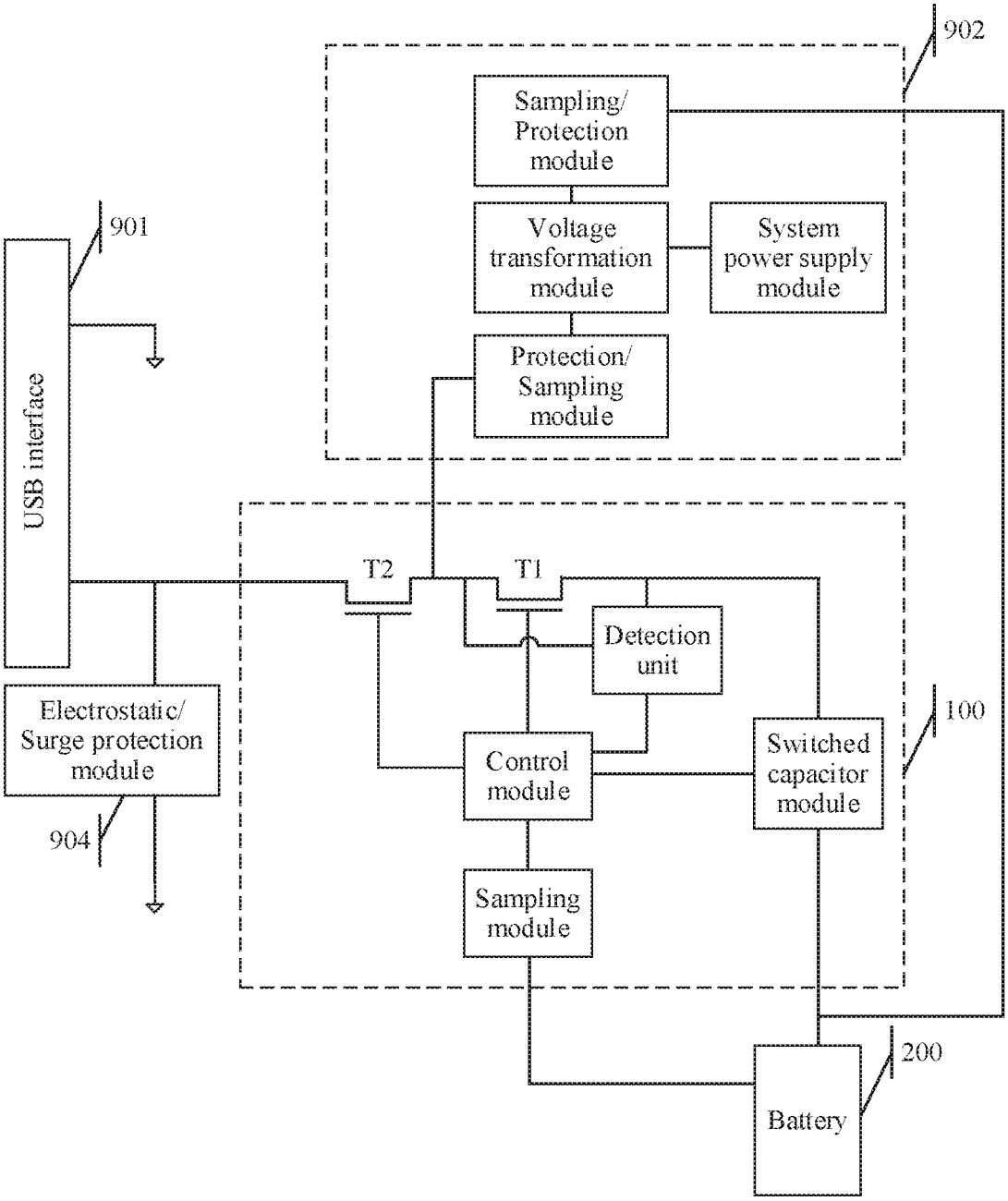
FIG. 11 is a schematic structural diagram 3 of a terminal according to an embodiment of this application.

To further describe in detail the terminal structure provided in the embodiments of this application, this application further provides a specific feasible implementation structure. As shown in FIG. 11, to simplify a schematic diagram, no control chip is shown in FIG. 11. As shown in FIG. 11, the charging interface of the terminal is a USB interface 901, and the second charging apparatus 902 includes a protection/sampling module, a transformation module, a sampling/protection module, and a system power supply module. The protection/sampling module is connected between a protection transistor T2 and a clamping transistor T1 of the first charging apparatus 100, to provide overcurrent protection and overvoltage protection for an internal structure of the second charging apparatus 902. In addition, the terminal further provides an electrostatic/surge protection module 904, to clamp a supply voltage input from the USB interface 901. When there is an excessively high supply voltage, the protection transistor T2 may be broken down, and therefore an overvoltage protection function is lost. The electrostatic/surge protection module 904 is disposed between the protection transistor T2 and the USB interface 901, to reduce a risk of breaking down the protection transistor T2.

Figure 12:
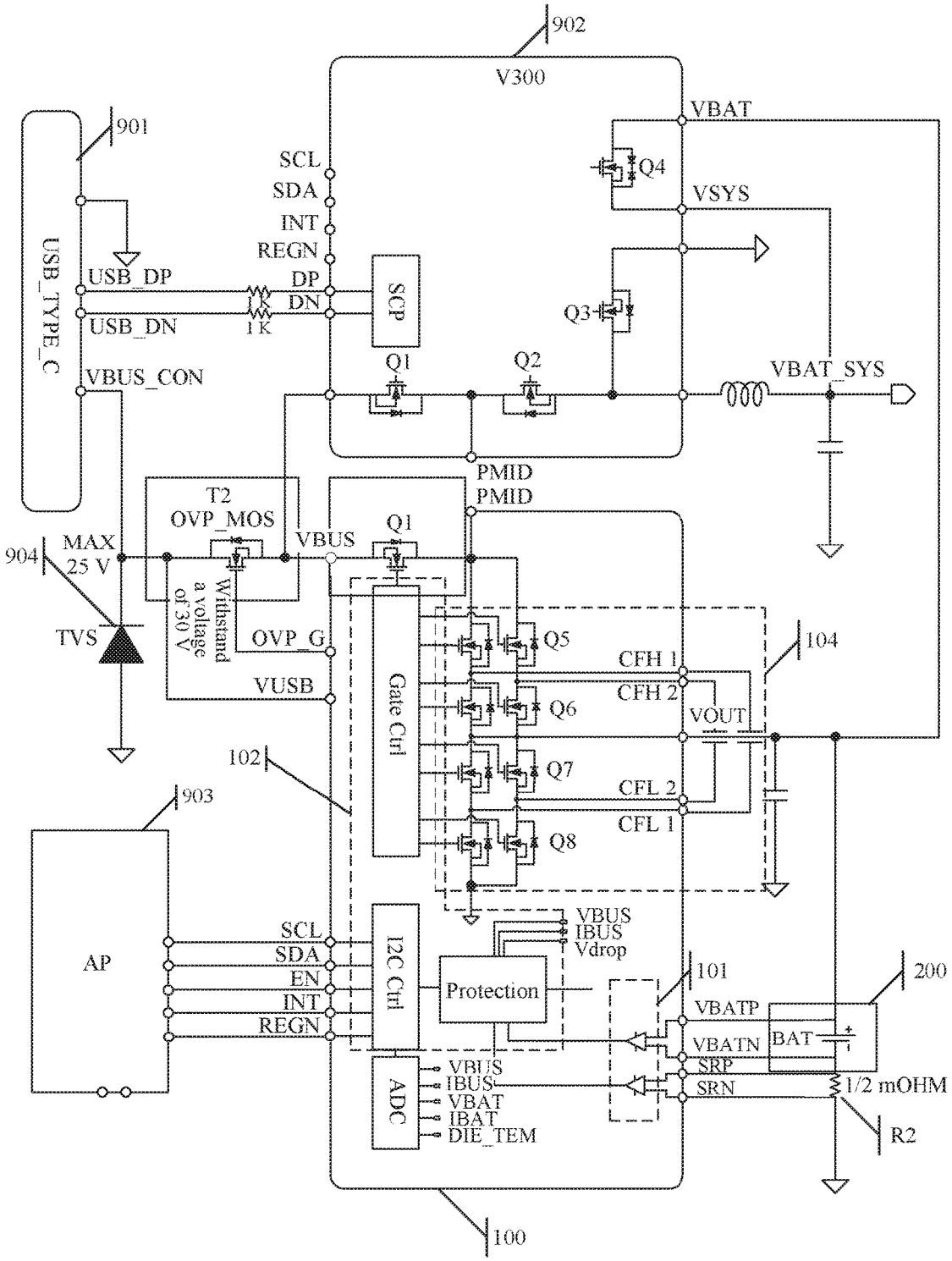
FIG. 12 is a schematic structural diagram 4 of a terminal according to an embodiment of this application.

Based on the terminal structure provided in FIG. 11, an embodiment of this application further provides a more detailed schematic structural diagram of the terminal. As shown in FIG. 12, the second charging apparatus 902 is a charging apparatus including a switching power supply charging circuit. As shown in FIG. 12, the electrostatic/surge protection module 904 may be implemented by a transient voltage suppressor (Transient Voltage Suppressor, TVS). The control chip 903 controls the first charging apparatus 100 and the second charging apparatus 903 by using an I2C interface. As shown in FIG. 12, in the first charging apparatus 100, the sampling module 101 includes at least two comparators. One of the comparators is configured to collect the battery current of the battery 200, and the other one is configured to collect a battery voltage of the battery 200. A control module 102 includes at least an I2C control circuit (I2C Ctrl), a gate control circuit (Gate Ctrl), a protection circuit (Protection), and the like. The I2C control circuit is configured to interact with the control chip 903 (AP), the gate control circuit is configured to control the clamping transistor T1, the protection transistor T2, and the switched capacitor module 104, and the protection circuit is configured to protect the battery from an overvoltage or overcurrent event in a charging process.

In conclusion, this application provides the charging apparatus and the terminal, to alleviate a problem that a charging voltage fluctuates with a supply voltage.

A person skilled in the art may clearly understand that reference may be mutually made to description of the embodiments provided in the present invention. For ease and brevity of description, for functions of the modules provided in the embodiments of the present invention, refer to the related description in the method embodiment of the present invention. Details are not described herein again.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" (comprising) does not exclude another component or another step, and "a" or "one" does not exclude a case of a plurality. Some measures are recorded in dependent claims that are different from each other, but this does not mean that these measures cannot be combined to produce a better effect.

Although this application is described with reference to specific features and the embodiments thereof, obviously, various modifications and combinations may be made to them without departing from the spirit and scope of this application. Correspondingly, this specification and the accompanying drawings are merely example description of this application defined by the appended claims, and are considered as any of or all modifications, variations, combinations or equivalents that cover the scope of this application. Obviously, a person skilled in the art can make various modifications and variations to this application without departing from the spirit and scope of this application. In this way, this application is intended to cover these modifications and variations made to this application provided that they fall within the scope of the following claims of this application and equivalent technologies thereof.

What is claimed is:

1. A charging apparatus, comprising:

a sampling module configured to:

couple to a battery, collect current status information of the battery, and provide the current status information, a clamping module configured to:

couple to a power supply, receive a power supply energy provided by the power supply, process the power supply energy into an output energy, and provide the output energy *to a switched capacitor module, wherein the switched capacitor module is configured to provide a charging energy to the battery, and* a control module coupled to the clamping module and the sampling module and configured to:

receive the current status information from the sampling module, perform an adjustment of the output energy based on the current status information, and provide a drive signal [based on the adjustment, and a switched capacitor module coupled to the clamping module and the control module configured to:

couple to the battery, receive the drive signal from the control module, receive the output energy from the clamping module, and provide a charging energy to the battery based on the drive signal and the output energy] *to the switched capacitor module.*

2. The charging apparatus of claim 1, wherein the clamping module comprises a clamping transistor, wherein the clamping transistor comprises:

a first electrode configured to couple to the power supply;

a second electrode configured to couple to the switched capacitor module; and a gate configured to couple to the control module, and wherein the control module is further configured to:

generate a drive voltage based on the current status information; and provide the drive voltage to the gate, wherein the drive voltage adjusts a conductive impedance between the first electrode and the second electrode, and wherein the conductive impedance adjust the power supply energy received by the clamping transistor to the output energy.

3. The charging apparatus of claim 2, wherein the current status information comprises a current value of a battery current and a voltage value of a battery voltage, and wherein the control module is further configured to:

generate a first drive voltage[:] *when the current value of the battery current is greater than a preset first current threshold or the voltage value of the battery voltage is greater than a preset first voltage threshold, wherein the first drive voltage adjusts a status of the clamping transistor to a high conductive impedance state* and provide the first drive voltage to the gate[ when the current value of the battery current is greater than a preset first current threshold or the voltage value of the battery voltage is greater than a preset first voltage threshold, wherein the first drive voltage adjusts a status of the clamping transistor to a high conductive impedance state]*; or*

*generate a second drive voltage when the current value of the battery current is less than or equal to the preset first current threshold and the voltage value of the battery voltage is less than or equal to the preset first voltage threshold, wherein the second drive voltage*

*adjusts the status of the clamping transistor to a low conductive impedance state, and provide the second drive voltage to the gate.*

4. The charging apparatus of claim 2, wherein the sampling module is further configured to:

couple to the power supply;

collect a voltage value of a supply voltage in the power supply energy from the power supply; and provide the voltage value of the supply voltage to the control module, and wherein the control module is further configured to:

[identify] *determine* that the voltage value of the supply voltage is greater than a preset second voltage threshold; and provide, in response to [identifying] *determining* that the voltage value of the supply voltage is greater than the preset second voltage threshold, a first cut-in voltage to the gate, wherein the first cut-in voltage controls the clamping transistor to decouple from the power supply.

5. The charging apparatus of claim 4, wherein the clamping module further comprises:

a sampling load comprising:

an input end coupled to the second electrode; and an output end coupled to the switched capacitor module; and a detection unit coupled to the input end, the output end, and the control module and configured to:

obtain a voltage difference between the input end and the output end;

determine, based on the voltage difference, a current value of an output current in the output energy from the clamping transistor to the switched capacitor module, and provide the current value of the output current to the control module, and wherein the control module is further configured to:

[identify] *determine* that the current value of the output current is greater than a preset second current threshold; and provide, in response to [identifying] *determining* that the current value of the output current is greater than the preset second current threshold, the first cut-in voltage to the gate.

6. The charging apparatus of claim 2, wherein the clamping module further comprises:

a protection transistor comprising:

a third electrode is configured to couple to the power supply;

a fourth electrode configured to couple to the first electrode; and a second gate configured to couple to the control module[; and a detection unit coupled to the first electrode, the second electrode, and the control module and configured to:

obtain a voltage difference between the first electrode and the second electrode;

determine, based on the voltage difference, a current value of an output current in the output energy from the clamping transistor to the switched capacitor module, and provide the current value of the output current to the control module, and wherein the control module is further configured to:

identify that the current value of the output current is greater than a preset second current threshold; and provide, in response to identifying that the current value of the output current is greater than the preset second current threshold, a second cut-in voltage to the second gate, wherein the second cut-in voltage controls the protection transistor to decouple from the power supply].

7. The charging apparatus of claim 6, wherein the sampling module is further configured to:

couple to the power supply;

collect a voltage value of a supply voltage in the power supply energy from the power supply;

provide the voltage value of the supply voltage to the control module, and wherein the control module is further configured to:

[identify] *determine* that the voltage value of the supply voltage is greater than a preset second voltage threshold; and provide, in response to the [identifying] *determining* that the voltage value of the supply voltage is greater than the preset second volume threshold, the second cut-in voltage to the second gate*, wherein the second cut-in voltage controls the protection transistor to decouple from the power supply.*

8. The charging apparatus of claim 1, wherein the current status information comprises a battery voltage, wherein the sampling module comprises a voltage sampling unit coupled to the control module, and wherein the voltage sampling unit is configured to:

couple to a positive pole of the battery and a negative pole of the battery;

obtain a first voltage at the positive pole and a second voltage at the negative pole of the battery;

determine the battery voltage based on the first voltage and the second voltage; and provide the battery voltage to the control module.

9. The charging apparatus of claim 1, wherein the current status information comprises a battery current, wherein the sampling module comprises a current sampling unit coupled to the control module, and wherein the current sampling unit is configured to:

couple to an input end and an output end of a current sensing resistor of the battery;

obtain a first voltage at the input end and a second voltage at the output end of the current sensing resistor, determine the battery current based on the first voltage and the second voltage; and provide the battery current to the control module.

10. A terminal, comprising:

a charging interface;

a battery; and a first charging apparatus coupled to the battery, the charging interface, and a power supply outside the terminal, and wherein the first charging apparatus comprises:

a sampling module configured to:

couple to a battery, collect current status information of the battery, and provide the current status information, a clamping module configured to:

couple to a power supply, receive a power supply energy provided by the power supply, process the power supply energy into an output energy, and provide the output energy *to a switched capacitor module, wherein the switched capacitor module is configured to provide a charging energy to the battery, and* a control module coupled to the clamping module and the sampling module and configured to:

receive the current status information from the sampling module, perform an adjustment of the output energy based on the current status information, and provide a drive signal [based on the adjustment, and a switched capacitor module coupled to the clamping module and the control module configured to:

couple to the battery, receive the drive signal from the control module, receive the output energy from the clamping module, and provide a charging energy to the battery based on the drive signal and the output energy] *to the switched capacitor module.*

11. The terminal of claim 10, further comprising:

a control chip; and a second charging apparatus comprising a second input interface coupled to the charging interface, a second output interface coupled to the battery, and a second control interface coupled to the control chip, and wherein the second charging apparatus is configured to:

receive, using the second control interface, a control signal from the control chip; and provide the charging energy to the battery based on the control signal, wherein the first charging apparatus comprises a first input interface coupled to the charging interface, a first output interface coupled to the battery, and a first control interface coupled to the control chip, and wherein the first charging apparatus is configured to:

receive, using the first control interface, a second control signal from the control chip; and provide the charging energy to the battery based on the second control signal, wherein the control chip comprises a power supply interaction interface coupled to the charging interface, a first control output interface coupled to the first control interface, and a second control output interface coupled to the second control interface and configured to:

obtain type information of the power supply using the power supply interaction interface;

generate a third control signal based on the type information;

provide the third control signal to the first charging apparatus using the first control output interface; and provide the third control signal to the second charging apparatus using the second control output interface, wherein the third control signal controls the first charging apparatus or the second charging apparatus to provide the charging energy to the battery.

[12. The terminal of claim 11, wherein the type information comprises a non-rated power supply, and wherein the control chip is further configured to:

obtain the type information using the power supply interaction interface; and when the type information is the non-rated power supply:

provide a fourth control signal for the first charging apparatus using the first control output interface, wherein the fourth control signal disables the first charging apparatus from providing the charging energy to the battery; and provide a fifth control signal for the second charging apparatus using the second control output interface, wherein the fifth control signal enables the second charging apparatus to provide the charging energy to the battery.]

[13. The terminal of claim 11, wherein the type information comprises a rated power supply, and wherein when the type information corresponds to the rated power supply, the control chip is further configured to:

provide a sixth control signal for the first charging apparatus using the first control output interface, wherein the sixth control signal enables the first charging apparatus to provide the charging energy to the battery; and provide a seventh control signal for the second charging apparatus using the second control output interface, wherein the seventh control signal disables the second charging apparatus from providing the charging energy to the battery.]

[14. The terminal of claim 11, wherein the type information comprises a rated power supply, wherein the first charging apparatus further comprises a sampling output interface coupled to the control chip, wherein the first charging apparatus is further configured to provide, to the control chip using the sampling output interface, the current status information, wherein the control chip further comprises a status information input interface coupled to the sampling output interface, and wherein when the type information is the rated power supply, the control chip is further configured to:

obtain the current status information using the status information input interface;

generate a rated control signal based on the current status information;

provide the rated control signal to the first charging apparatus using the first control output interface; and provide the rated control signal to the second charging apparatus using the second control output interface.]

[15. The terminal of claim 14, wherein the current status information comprises a current value of a battery current, and wherein the control chip is further configured to:

obtain the current value of the battery current using the status information input interface; and when the current value of the battery current is less than a preset threshold;

provide a first rated control signal for the first charging apparatus using the first control output interface, wherein the first rated control signal disables the first charging apparatus from providing the charging energy to the battery; and provide a second rated control signal for the second charging apparatus using the second control output interface, wherein the second rated control signal enables the second charging apparatus to provide the charging energy to the battery.]

[16. The terminal of claim 11, wherein the second charging apparatus comprises at least one of a switching power supply charging circuit, a linear charging circuit, a three-level charging circuit, or a switching power supply boost charging circuit.]

[17. The charging apparatus of claim 2, wherein the current status information comprises a current value of a battery current and a voltage value of a battery voltage, and wherein the control module is further configured to:

generate a second drive voltage; and provide the second drive voltage to the gate when the current value of the battery current is less than or equal to a preset first current threshold and the voltage value of the battery voltage is less than or equal to a preset first voltage threshold, wherein the second drive voltage adjusts a status of the clamping transistor to a low conductive impedance state.]

[18. The terminal of claim 14, wherein the current status information comprises a current value of a battery current, and wherein the control chip is further configured to:

obtain the current value of the battery current using the status information input interface; and when the current value of the battery current is greater than or equal to a preset threshold:

provide a third rated control signal for the first charging apparatus using the first control output interface, wherein the third rated control signal enables the first charging apparatus to provide the charging energy to the battery; and provide a fourth rated control signal for the second charging apparatus using the second control output interface, wherein the fourth rated control signal disables the second charging apparatus from providing the charging energy to the battery.]

19. The terminal of claim 10, wherein the clamping module further comprises a clamping transistor, and wherein the clamping transistor comprises:

a first electrode configured to couple to the power supply;

a second electrode coupled to the switched capacitor module; and a gate coupled to the control module, and wherein the control module is further configured to:

generate a drive voltage based on the current status information; and provide the drive voltage to the gate, wherein the drive voltage adjusts conductive impedance between the first electrode and the second electrode, and wherein the conductive impedance adjusts the power supply energy received by the clamping transistor to the output energy.

20. The terminal of claim 19, wherein the current status information comprises a current value of a battery current and a voltage value of a battery voltage, and wherein the control module is further configured to:

generate a first drive voltage*when the current value of the battery current is greater than a preset first current threshold or the voltage value of the battery voltage is greater than a preset first voltage threshold, wherein the first drive voltage adjusts a status of the clamping transistor to a high conductive impedance state*, and provide the first drive voltage to the gate [when the current value of the battery current is greater than a preset first current threshold or the voltage value of the battery voltage is greater than a preset first voltage threshold, wherein the first drive voltage adjusts a status of the clamping transistor to a high conductive impedance state]; or generate a second drive voltage *when the current value of the battery current is less than or equal to the preset first current threshold and the voltage value of the battery voltage is less than or equal to the preset first voltage threshold, wherein the second drive voltage adjusts the status of the clamping transistor to a low conductive impedance state*, and provide the second drive voltage [for] *to* the gate [when the current value of the battery current is less than or equal to the preset first current threshold and the voltage value of the battery voltage is less than or equal to the preset first voltage threshold, wherein the second drive voltage adjusts the status of the clamping transistor to a low conductive impedance state].

*21. The charging apparatus of claim 1, wherein the switched capacitor module is a 2:1 switched capacitor charging circuit of 3:1 switched capacitor charging circuit.*

*22. The terminal of claim 19, wherein the clamping module further comprises a protection transistor, comprising:*

*a third electrode configured to couple to the power supply;*

*a fourth electrode configured to couple to the first electrode; and*

*a second gate configured to couple to the control module.*

*23. The terminal of claim 22, wherein the sampling module is further configured to:*

*couple to the power supply;*

*collect a voltage value of a supply voltage in the power supply energy from the power supply;*

*provide the voltage value of the supply voltage to the control module; and*

*wherein the control module is further configured to:*

*determine that the voltage value of the supply voltage is greater than a preset second voltage threshold; and*

*provide, in response to the determining that the voltage value of the supply voltage is greater than the preset second voltage threshold, the second cut-in voltage to the second gate, wherein the second cut-in voltage controls the protection transistor to decouple from the power supply.*

*24. The terminal of claim 10, wherein the sampling module is further configured to:*

*couple to the power supply;*

*collect a voltage value of a supply voltage in the power supply energy from the power supply; and*

*provide the voltage value of the supply voltage to the control module, and*

*wherein the control module is further configured to:*

*determine that the voltage value of the supply voltage is greater than a preset second voltage threshold; and*

*provide, in response to determining that the voltage value of the supply voltage is greater than the preset second voltage threshold, a first cut-in voltage to the gate, wherein the first cut-in voltage controls the clamping transistor to decouple from the power supply.*

*25. The terminal of claim 10, wherein the current status information comprises a battery voltage, wherein the sampling module comprises a voltage sampling unit coupled to the control module, and wherein the voltage sampling unit is configured to:*

*couple to a positive pole of the battery and a negative pole of the battery;*

*obtain a first voltage at the positive pole and a second voltage at the negative pole of the battery;*

*determine the battery voltage based on the first voltage and the second voltage; and*

*provide the battery voltage to the control module.*

*26. The terminal of claim 10, wherein the current status information comprises a battery current, wherein the sampling module comprises a current sampling unit coupled to the control module, and wherein the current sampling unit is configured to:*

*couple to an input end and an output end of a current sensing resistor of the battery;*

*obtain a first voltage at the input end and a second voltage at the output end of the current sensing resistor;*

*determine the battery current based on the first voltage and the second voltage; and*

*provide the battery current to the control module.*

*27. The terminal of claim 10, wherein the switched capacitor module is a 2:1 switched capacitor charging circuit or 3:1 switched capacitor charging circuit.*

* * * * *